(12) United States Patent
Bejcek et al.

(10) Patent No.: US 10,819,194 B2
(45) Date of Patent: Oct. 27, 2020

(54) INTERNAL COMBUSTION ENGINE WITH INTEGRATED CONNECTIVITY DEVICE

(71) Applicant: Honda Motor Co., Ltd., Tokyo (JP)

(72) Inventors: Andrew Bejcek, Chapel Hill, NC (US); Christopher D. Meeks, Greensboro, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/398,557

(22) Filed: Apr. 30, 2019

(65) Prior Publication Data

US 2020/0060090 A1 Feb. 27, 2020

Related U.S. Application Data

(63) Continuation-in-part of application No. 16/359,769, filed on Mar. 20, 2019, which is a continuation-in-part of application No. 16/156,094, filed on Oct. 10, 2018, which is a continuation-in-part of application No. 16/113,653, filed on Aug. 27, 2018.

(51) Int. Cl.

| H02K 11/35 | (2016.01) |
|---|---|
| A01D 69/02 | (2006.01) |
| F02N 11/04 | (2006.01) |
| A01D 34/00 | (2006.01) |
| H02K 51/00 | (2006.01) |
| H02K 7/18 | (2006.01) |
| H02K 5/04 | (2006.01) |
| F02P 15/00 | (2006.01) |

(52) U.S. Cl.
CPC ........... *H02K 11/35* (2016.01); *A01D 34/008* (2013.01); *A01D 69/025* (2013.01); *F02N 11/04* (2013.01); *F02P 15/006* (2013.01); *H02K 5/04* (2013.01); *H02K 7/1815* (2013.01); *H02K 51/00* (2013.01)

(58) Field of Classification Search
CPC ..... A01D 69/025; A01D 34/008; F02N 11/04; H02K 51/00; H02K 11/35; H02K 5/04; H02K 7/1815; F02P 15/006
USPC ...................................... 123/179.28
See application file for complete search history.

(56) References Cited

U.S. PATENT DOCUMENTS

| 5,070,686 A | 12/1991 | Isaka et al. |
|---|---|---|
| 5,392,753 A | 2/1995 | Burson et al. |
| 5,563,774 A | 10/1996 | Welsch |

(Continued)

FOREIGN PATENT DOCUMENTS

| JP | 2006226257 A | 8/2006 |
|---|---|---|
| WO | 2008009244 A1 | 1/2008 |

OTHER PUBLICATIONS

International Search Report and Written Opinion for PCT/US19/48285, dated Nov. 13, 2019. 10 pages.

*Primary Examiner* — Mahmoud Gimie
(74) *Attorney, Agent, or Firm* — Armstrong Teasdale LLP

(57) ABSTRACT

A power tool is provided. The power tool includes an internal combustion engine and an integrated device coupled to the internal combustion engine. The internal combustion engine includes a flywheel or another rotating component. The integrated device is enclosed in a housing and is coupled adjacent to either the flywheel or a rotating component. The integrated device includes a printed circuit board with a wireless communications module and a power generation portion which receives power wirelessly from the internal combustion engine.

20 Claims, 20 Drawing Sheets

(56) References Cited

U.S. PATENT DOCUMENTS

| | | | |
|---|---|---|---|
| D468,751 S | 1/2003 | Neeley et al. | |
| 6,675,562 B2 | 1/2004 | Lawrence | |
| 6,864,606 B2 | 3/2005 | Rose, Sr. | |
| 6,987,328 B2 | 1/2006 | Osborne | |
| 7,546,836 B2 * | 6/2009 | Andersson | F02P 3/0815 |
| | | | 123/406.56 |
| 9,127,658 B2 | 9/2015 | Koenen et al. | |
| 9,737,068 B1 | 8/2017 | Lytle, Jr. | |
| 2004/0014337 A1 * | 1/2004 | Throum | H05K 5/0013 |
| | | | 439/76.1 |
| 2005/0150281 A1 | 7/2005 | Schroeder et al. | |
| 2005/0228557 A1 | 10/2005 | Swan | |
| 2006/0186875 A1 | 8/2006 | Schroeder et al. | |
| 2007/0182251 A1 | 8/2007 | Miyashita et al. | |
| 2007/0204833 A1 | 9/2007 | Miyashita et al. | |
| 2009/0064957 A1 | 3/2009 | Grybush | |
| 2009/0126686 A1 | 5/2009 | Sugiyama et al. | |
| 2010/0095932 A1 | 4/2010 | Nakauchi et al. | |
| 2014/0042876 A1 | 2/2014 | Brockerhoff et al. | |
| 2014/0080329 A1 * | 3/2014 | Yamanaka | H01R 13/5202 |
| | | | 439/76.1 |
| 2014/0266659 A1 | 9/2014 | Dwyer et al. | |
| 2014/0266664 A1 | 9/2014 | Dwyer et al. | |
| 2015/0006025 A1 | 1/2015 | Rhoades et al. | |
| 2016/0047349 A1 | 2/2016 | Ayusawa et al. | |
| 2017/0170773 A1 | 6/2017 | Donolo et al. | |
| 2017/0347521 A1 | 12/2017 | Tjernberg et al. | |
| 2018/0068493 A1 | 3/2018 | Russ et al. | |
| 2018/0143634 A1 | 5/2018 | Ott et al. | |
| 2018/0163689 A1 | 6/2018 | Bykowski et al. | |
| 2018/0238256 A1 | 8/2018 | Noguchi et al. | |
| 2018/0263182 A1 | 9/2018 | Albinger et al. | |
| 2019/0074744 A1 | 3/2019 | Koenen et al. | |
| 2019/0178219 A1 | 6/2019 | Koenen | |
| 2019/0257280 A1 * | 8/2019 | Andersson | F02P 11/00 |

* cited by examiner

INTERNAL COMBUSTION ENGINE WITH INTEGRATED CONNECTIVITY DEVICE

CROSS REFERENCE TO RELATED APPLICATIONS

This application is a continuation-in-part and claims priority to and the benefit of the filing date of U.S. patent application Ser. No. 16/359,769 filed Mar. 20, 2019, for INTERNAL COMBUSTION ENGINE WITH INTEGRATED CONNECTIVITY DEVICE which is hereby incorporated by reference and is assigned to the assignee of the present application. Further, U.S. patent application Ser. No. 16/359,769 is a continuation-in-part of U.S. patent application Ser. No. 16/156,094, filed Oct. 10, 2018. Furthermore, U.S. patent application Ser. No. 16/156,094 is a continuation-in-part of U.S. patent application Ser. No. 16/113,653 filed on Aug. 27, 2018. All of the above mentioned applications are expressly incorporated by reference.

BACKGROUND

This invention relates generally to integrated devices, and more particularly, to internal combustion engines that include wireless connectivity and communications technology.

As the use of wireless communications technology, such as Internet of Things (IoT) technology is becoming more common for use in cooperation with power equipment, at least some known manufacturers have attempted to commercialize equipment using the technology. For example, at least some riding lawn mowers include a built-in meter in its instrument panel that includes Bluetooth wireless connectivity. Such meters transmit usage information to a remote device or to a cloud-based database. Although reliable, such wireless communications systems are generally only available on larger equipment, as such systems require a battery and a charging system.

At least some other known riding mowers include a pass-through ignition switch connector. The ignition switch connector includes a main power circuit and a switched power circuit. The wireless communications device on such equipment uses the power circuit as a power source and uses the switched power circuit to determine whether the equipment is operating. Operating or usage data is transmitted via Bluetooth wireless connectivity to a remote device or to a cloud-based database. Again, such wireless communications systems are generally only available on larger equipment as such systems require multiple power circuits, a battery, and a charging system.

In an effort to incorporate wireless communications technology on smaller equipment, at least some manufacturers include a communications accessory that is coupled to the equipment, generally as a stick-on device, that acts as a Bluetooth-enabled hour meter. Specifically, such devices determine the engine is operating using an accelerometer to sense vibration. The information is transmitted to a remote device. Although, marketable, the use of such wireless communications accessories may be limited as the battery in such devices may require frequent replacement and/or the accelerometer may be prone to errors and/or accidental activation, such as when the mower is transported from one location to another.

BRIEF DESCRIPTION

In one aspect, a power tool is provided. The power tool includes an internal combustion engine. The internal combustion engine includes a flywheel with a magnetic portion. An integrated device with printed circuit board having a power generation portion is enclosed in a housing. The housing is secured in close proximity to the flywheel such that the integrated device generates power wirelessly from the flywheel when the internal combustion engine is operating.

In another aspect, an internal combustion engine assembly is provided. The internal combustion engine assembly includes a flywheel with a magnetic portion, and an integrated device capable of receiving power wirelessly from the internal combustion engine when the flywheel is rotating. The integrated device is secured in a housing that is attached to a cover of the engine assembly.

In a further aspect, a power tool is provided. The power tool includes an internal combustion engine assembly with a rotating component and a source of a magnetic field. The power tool has an integrated device with a printed circuit board having a power generation portion capable of receiving power wirelessly from the source of the magnetic field. The integrated device is enclosed in a housing with a removable portion.

The power tool includes an integrated device with a printed circuit board having a power generation portion to harvest energy wirelessly from the source of magnetic field when the internal combustion engine assembly is operating.

BRIEF DESCRIPTION OF THE DRAWINGS

FIG. 15 is a cutaway top view of the integrated device shown in

FIG. 14.

DETAILED DESCRIPTION

Embodiments of the present disclosure relate to power tools, including walk-behind lawnmowers, which include an internal combustion engine assembly including an integrated device capable of wireless communication, such as, but not limited to Internet of Things (IoT) technology. In some embodiments, the wireless communications device is received in a recessed portion of a cover coupled to an internal combustion engine. In some embodiments the cover is fabricated from a magnetically non-permeable material, such as, but not limited to, a non-magnetic material such as plastic for example. In each implementation, the internal combustion engine includes a flywheel with a magnetic portion and an integrated device coupled within a cavity defined by the cover. The integrated device includes a printed circuit board with a power generation portion that harvests energy from the internal combustion engine to power its wireless communication module which transmits operating data without being coupled to a battery.

The embodiments described herein are exemplary and are not limited to the descriptions provided. For example, although described in conjunction with a lawnmower, the invention described herein is not limited for use with a lawnmower, and may be instead used with other power tools or power equipment that include an internal combustion engine, such as, but not limited to, snow blowers, leaf blowers, pressure washers, string trimmers, brush cutters, generators, chainsaws, water pumps, go-karts, plate compactors, tampers, powered augers, fans, and/or paint sprayers. In addition, although portions of the description are described in conjunction with an IoT device, the invention described herein is not limited for use in conjunction with an IoT device, and rather, may instead be used with any wireless communications device that enables the power tools described herein to function as described herein.

Figure 1:
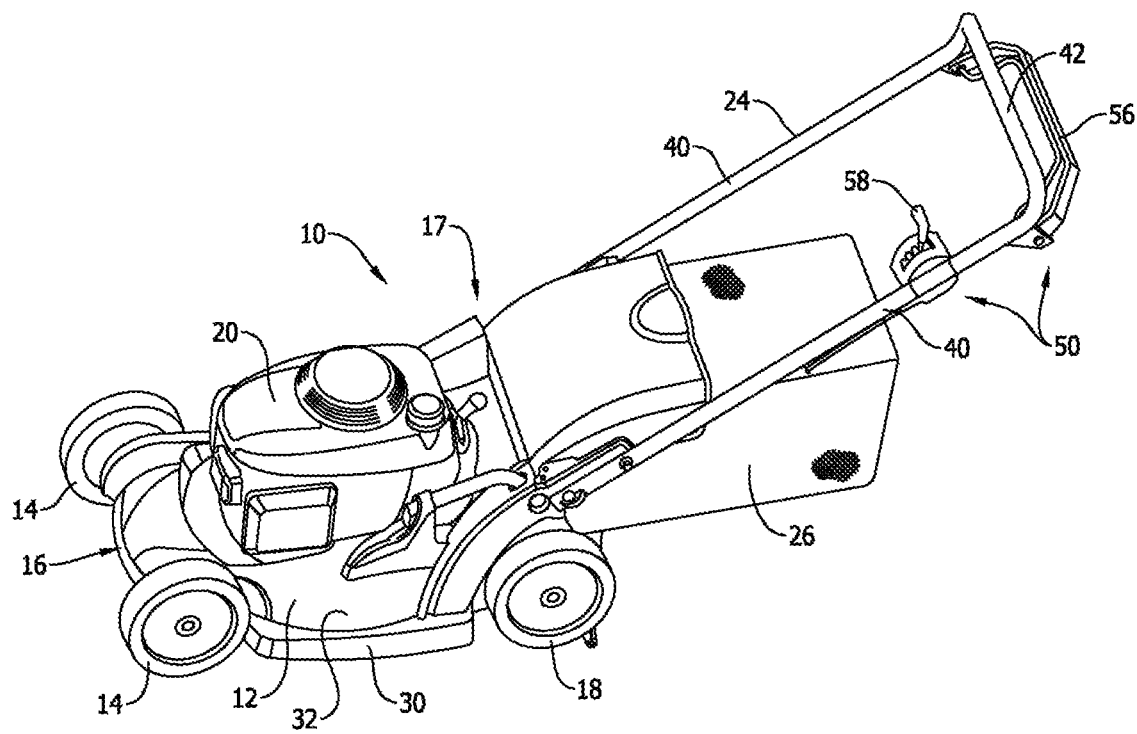
FIG. 1 is a perspective view of an exemplary walk-behind lawnmower.

FIG. 1 is a perspective view of an exemplary walk-behind lawnmower 10. In the exemplary embodiment, lawnmower 10 is a self-propelled, walk-behind lawnmower that is used to cut vegetation. In the exemplary embodiment, lawnmower 10 includes a cutter housing or deck 12 that defines a cavity (not shown) below it. A pair of front wheels 14 are coupled to a forward side 16 of lawnmower 10, and a second pair of rear wheels 18 are coupled to an opposite rear side 17 of lawnmower 10. A cutting blade (not shown) is rotatably coupled to an internal combustion engine 20 such that the cutting blade is beneath deck 12. A steering handle 24 is coupled to deck 12 such that handle 24 extends upwardly from deck 12. In the exemplary embodiment, lawnmower 10 includes an optional collection bag 26 removably coupled to mower rear side 17.

In the exemplary embodiment, deck 12 is generally rectangular and includes a pair of opposing sides 30 that extend between forward and rear sides 16 and 17, respectively. In other embodiments, deck 12 may have any other shape that enables lawnmower 10 to function as described herein. Deck 12 also includes an upper surface 32 and an opposite inner surface (not shown). The deck inner surface defines a portion of the cutter housing and defines a cavity (not shown) that the cutting blades are rotatably coupled within.

In the exemplary embodiment, the cutting blades are rotatably coupled to lawnmower 10 and rotate about an axis of rotation (not shown) that is substantially vertical such that the blades rotate in generally horizontal cutting planes within the cutter housing cavity. The blades may be configured as either a single cutting element or as multiple cutting elements that each cut vegetation at the level of the cutting plane.

Handle 24 is generally U-shaped and extends upwardly and rearward from deck rear side 17. Handle 24 enables a user who walks behind lawnmower 10 to guide and manipulate lawnmower 10 during operation of lawnmower 10. In the exemplary embodiment, handle 24 includes a pair of vertically-oriented support members 40 and a generally horizontally-oriented support member 42 that extends laterally between members 40 and that forms a hand grip for the user.

In the exemplary embodiment, handle 24 supports several controls 50 for the mower. For example, in the exemplary embodiment, lawnmower 10 is self-propelled and includes a drive clutch lever 56 that is coupled to handle 24 to enable the user to selectively engage and disengage a transmission within the propulsion system. In addition, in the exemplary embodiment, a throttle lever 58 is coupled to handle 24. Throttle lever 58 enables a user to control and vary the engine speed. In addition, in the exemplary embodiment, lawnmower 10 also includes a cutter system clutching system (not shown) that enables a user to selectively start and stop blade rotation. In one embodiment, the cutter system clutching system is similar to a known blade brake clutch (BBC) or a belt clutching pulley.

Figure 2:
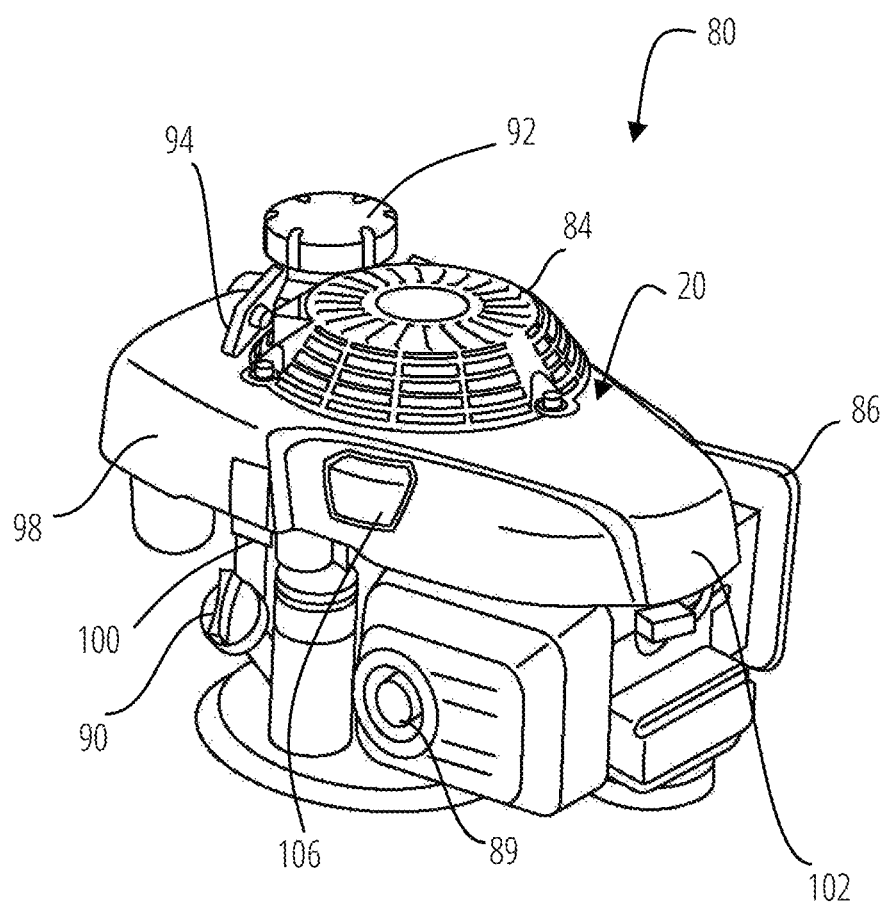
FIG. 2 is a perspective view of an exemplary internal combustion engine assembly that may be used with the lawnmower shown in FIG. 1.
Figure 3:
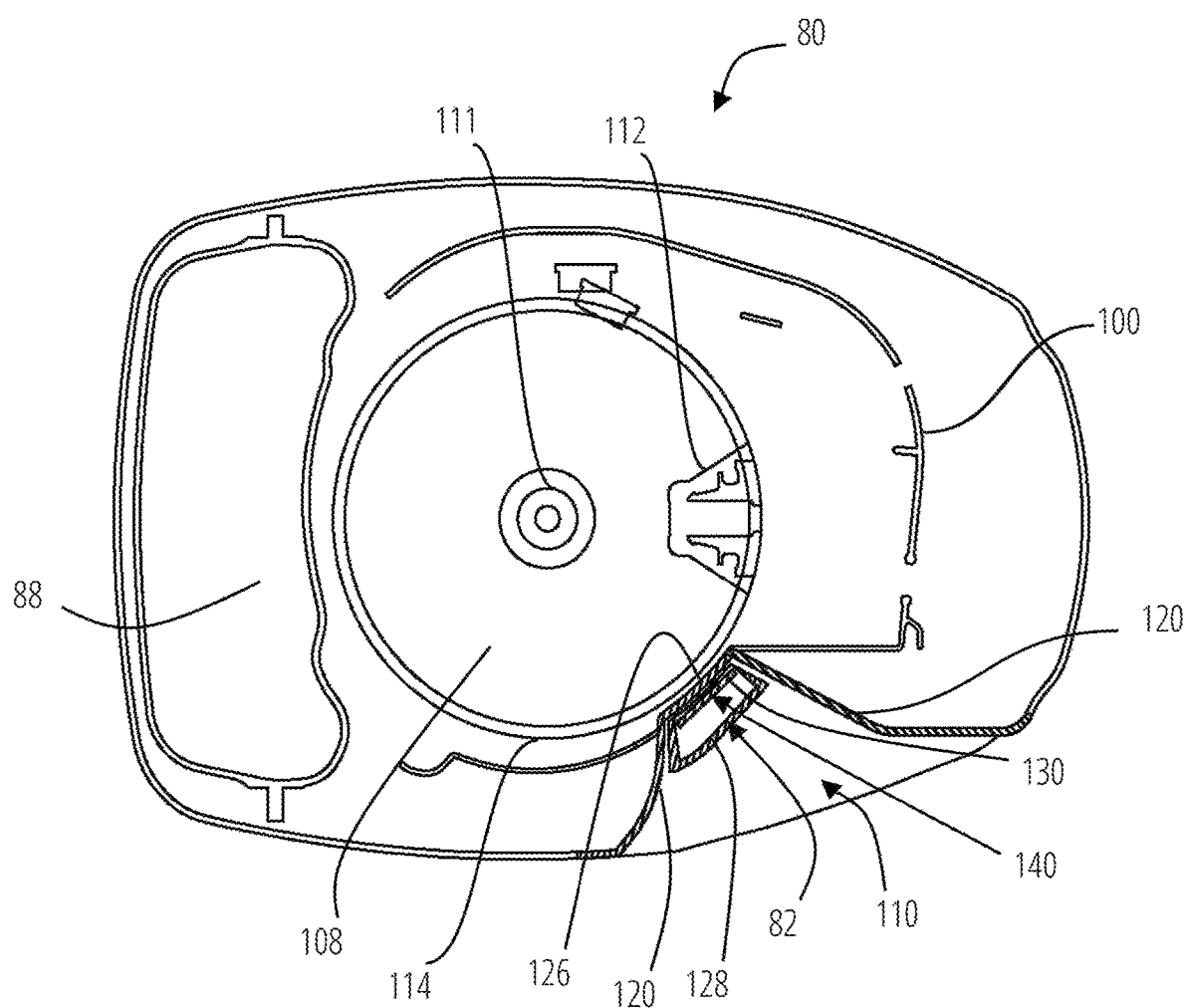
FIG. 3 is a partial cutaway top view of the internal combustion engine assembly with an integrated device installed in a recessed area.

FIG. 2 is a perspective view of an exemplary internal combustion engine assembly 80 that may be used with lawnmower 10. FIG. 3 is a partial cutaway top view of the internal combustion engine assembly 80 with an integrated device 82 installed in a recessed area 110. Engine assembly 80 includes an integrated device 82 coupled thereto to monitor operating data or usage data as described in more detail below. In the exemplary embodiment, the integrated device 82 may include Internet of Things (IoT) technology.

Although the integrated device 82 may be described in portions herein as being an IoT device, in alternative embodiments any other wireless connectivity or communication device that enables the power tools described herein to function as described herein may be used. For example, in one alternative embodiment, integrated device 82 does not transmit data via a cellular or WiFi internet connection, but rather integrated device 82 maintains a peer-to-peer (P2P) connection wherein usage data is transmitted wirelessly to a remote device, to enable the remote device to utilize the data locally in an application on the device. The remote device application may utilize its internet connection to share this usage data with a remote database and to enable IoT functionality. In another alternative embodiment, device 82 is directly connected to the internet via a cellular modem rather than connecting via Bluetooth.

Figure 4:
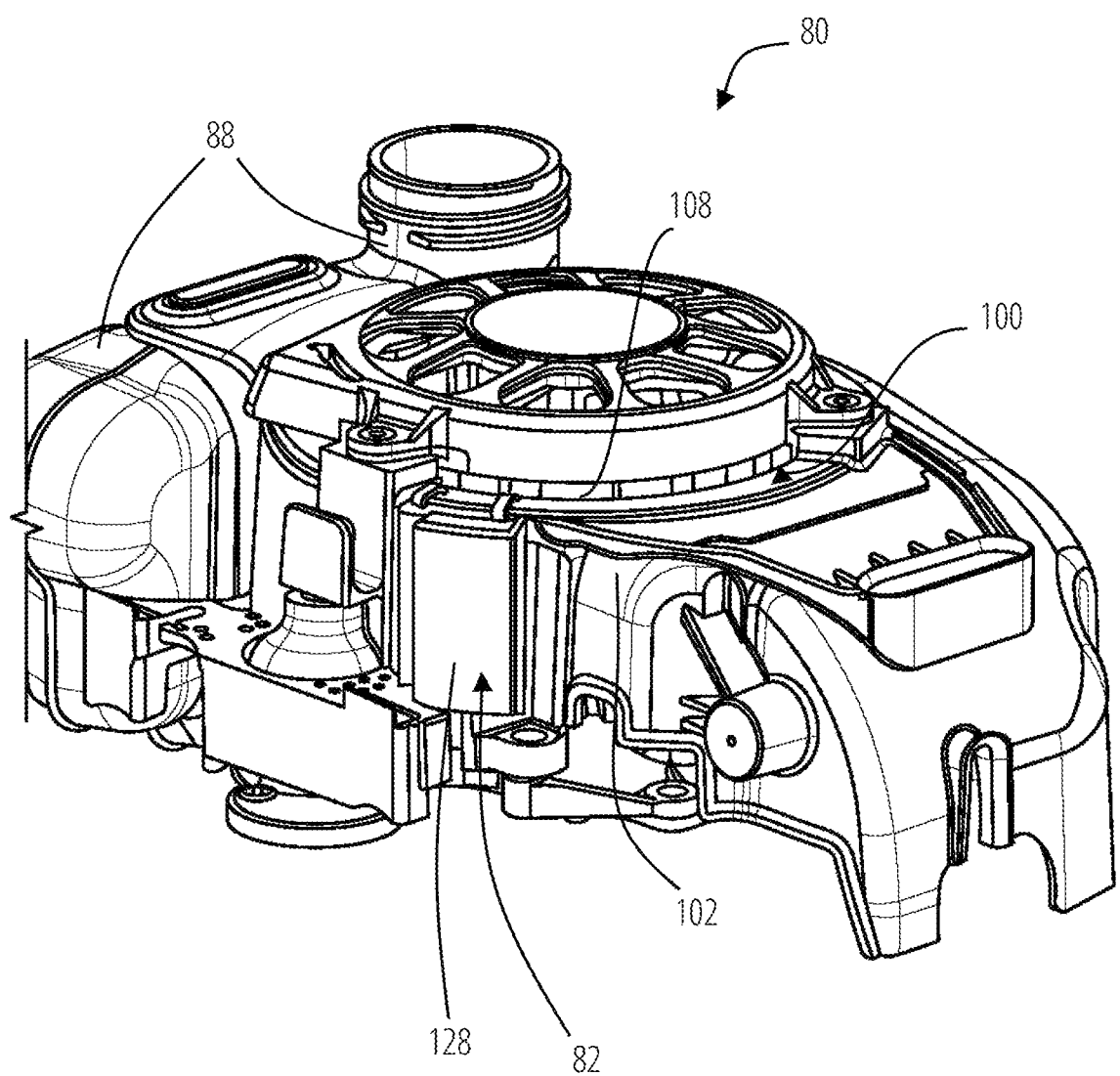
FIG. 4 is a perspective view of the internal combustion engine assembly shown in FIG. 2 with the top cover removed and the integrated device installed with a snap-fit.

In the exemplary embodiment, engine 20 includes a fuel tank 88 (shown in FIG. 3), an oil sump (not shown), a recoil starter assembly 84, an air cleaner assembly 86, and a muffler 89. An oil filler cap 90 provides access to the oil sump, and a fuel tank cap 92 provides access to fuel tank 88. As shown in FIG. 2, the recoil starter assembly 84 includes a pull handle 94 and recoil starter assembly 84 is coupled to engine 20 against a top cover 98. A cover 100 is located under the top cover 98 and is best shown in FIG. 4. In one embodiment, engine 20 is similar to an engine used with an HRR216VLA Rotary Mower commercially available from American Honda Motor Co., Inc.

The top cover 98 may include a removable panel 106 for accessing the integrated device 82, as shown in FIG. 2. In some embodiments, the removable panel 106 is stylized, such as a dot with semi-circles radiating above it, to indicate that a wireless connectivity device may be coupled therein and that lawnmower 10 is compatible with such a device. Additionally, other areas of the lawnmower 10 may include a stylized portion, such as a dot with semi-circles radiating above it, to indicate that a wireless connectivity device may be coupled therein and that lawnmower 10 is compatible with such a device.

Recoil starter assembly handle 94 is connected to a starter rope (not shown) that enables a user to engage a starting mechanism (not shown) to start engine 20. In the exemplary embodiment, the starter rope is coupled to a pulley system that enables the rope to be pulled out and recoil automatically within recoil starter assembly 84. More specifically, when the starter rope is pulled out of the recoil starter assembly 84, a recoil spring is wound that recoils the rope onto the pulley when the user lets go of handle 94.

Figure 11:
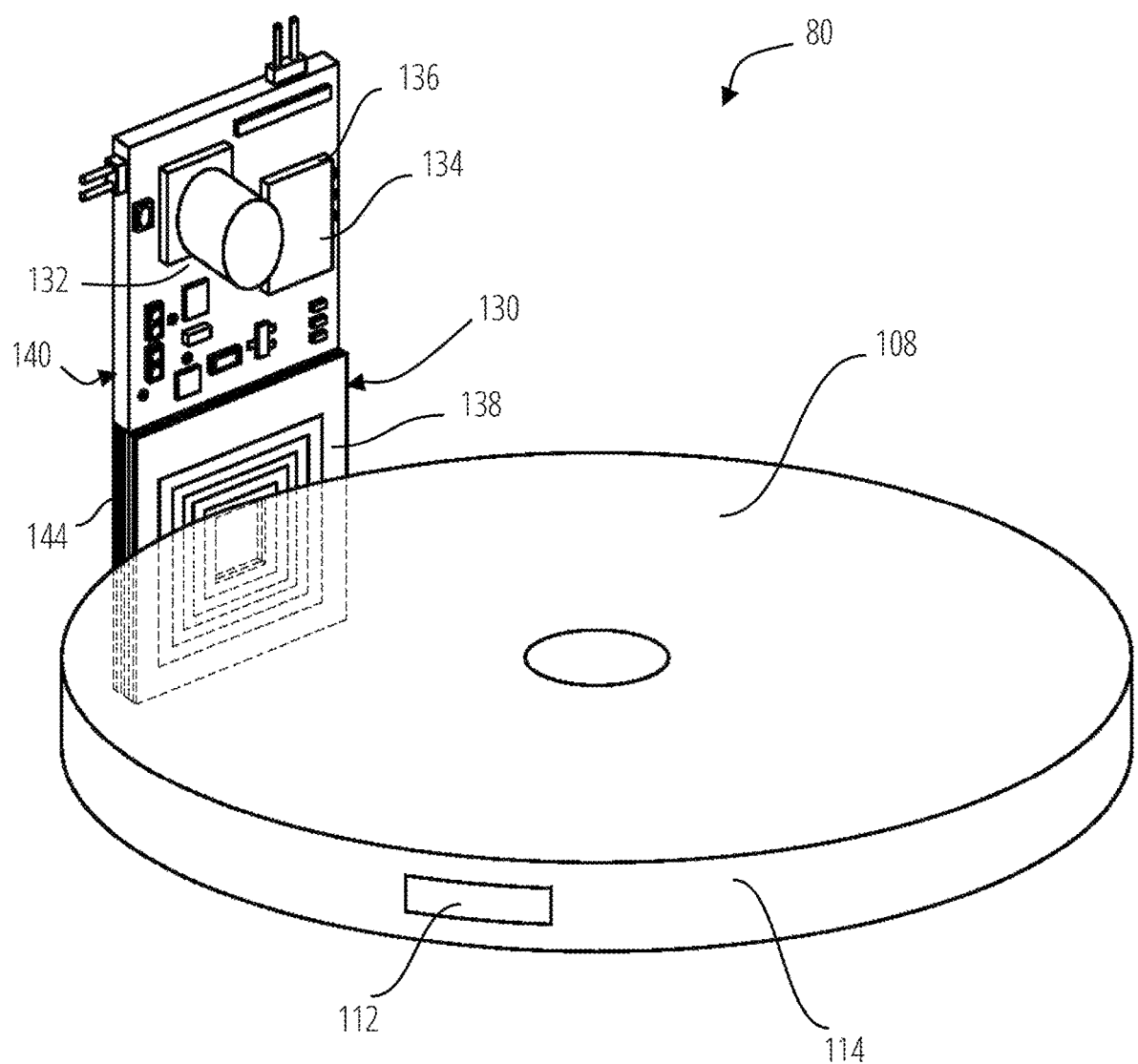
FIG. 11 is a perspective schematic view of a portion of an integrated device that may be used with the internal combustion engine shown in FIGS. 2 and 3.

Pulling recoil starter assembly 84 causes a flywheel 108 to rotate with a crankshaft 111 within engine 20. Flywheel 108 is securely fixed to crankshaft 111 and includes at least one magnetic portion 112 coupled to the flywheel 108. More specifically, the magnetic portion 112 is coupled in close proximity to a radially outer edge 114 of the flywheel 108 to enable magnetic energy to be formed as flywheel 108 is rotated as shown in FIG. 3 and FIG. 11. When enough magnetic energy is formed, an ignition module (not shown) ignites a voltage spark required for internal combustion within engine 20.

In the exemplary embodiment, cover 100 is fabricated from a magnetically non-permeable material, such as, but not limited to, a non-magnetic material such as plastic, and may be formed with a recessed area 110. Recessed area 110 is sized to receive the integrated device 82 therein, as shown in FIG. 3.

Recessed area 110, in the exemplary embodiment, is generally defined by a pair of side walls 120, and a radially inner wall 126 adjacent to the flywheel 108, as shown in FIG. 3. Alternatively, the recessed area 110 may have any other shape that enables the integrated device 82 and the lawnmower 10 to function as described herein. Moreover, in the exemplary embodiment, the inner wall 126 is formed with a radius of curvature that substantially complements a portion of the radially outer edge 114 of the flywheel 108. Moreover, the inner wall 126 of the recessed area 110 may be thinner than other portions of the cover 100. As such, the combination of the shape of the inner wall 126 and the reduced thickness of inner wall 126 facilitates reducing an amount of clearance or space between the integrated device 82 and the flywheel 108. Accordingly, and as explained in more detail below, the orientation of the integrated device 82 relative to the flywheel 108 facilitates enhancing and maximizing the magnetic field strength from the magnetic portion 112.

FIG. 4 is a perspective view of the internal combustion engine assembly shown in FIG. 2 with the top cover removed. The cover 100 surrounds various components of the internal combustion assembly 80, including the flywheel 108. The integrated device 82 is shown attached to an outer surface 102 of the cover 100. As described above, in the exemplary embodiment shown in FIG. 4, the cover 100 is fabricated from a magnetically non-permeable material, such as plastic.

Figure 5:
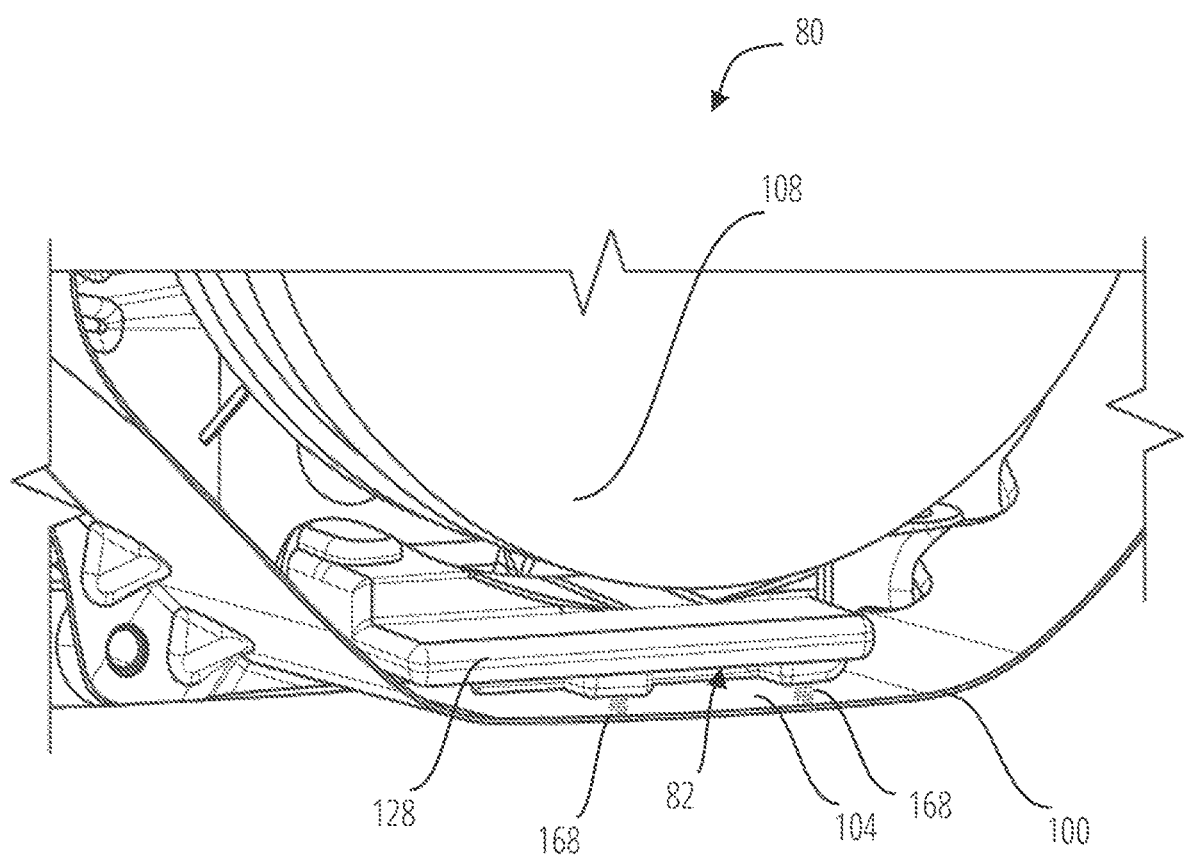
FIG. 5 is a perspective schematic view of a portion of the internal combustion engine assembly with the integrated device installed in an alternative location.

FIG. 5 is a perspective schematic view of a portion the internal combustion engine assembly 80 with the integrated device 82 installed in an alternative location. In alternative embodiments, the cover 100 may be made from a metallic material or other magnetically permeable material. In such embodiments, the integrated device 82 may be mounted to an inner surface 104 of the cover 100 to avoid magnetic interference, as shown in FIG. 5. The integrated device 82 is removably coupled to the inner surface 104 using a mechanical fastener 168, including for example, but not limited to screws, snaps, anchor bolts, studs, or threaded fasteners, or hook and loop material. Alternatively, any other coupling means may be used, including removable adhesives or epoxy that enables the integrated device 82 to be removably coupled. In other alternative embodiments, the integrated device 82 may be permanently mounted to the cover 100.

Figure 6:
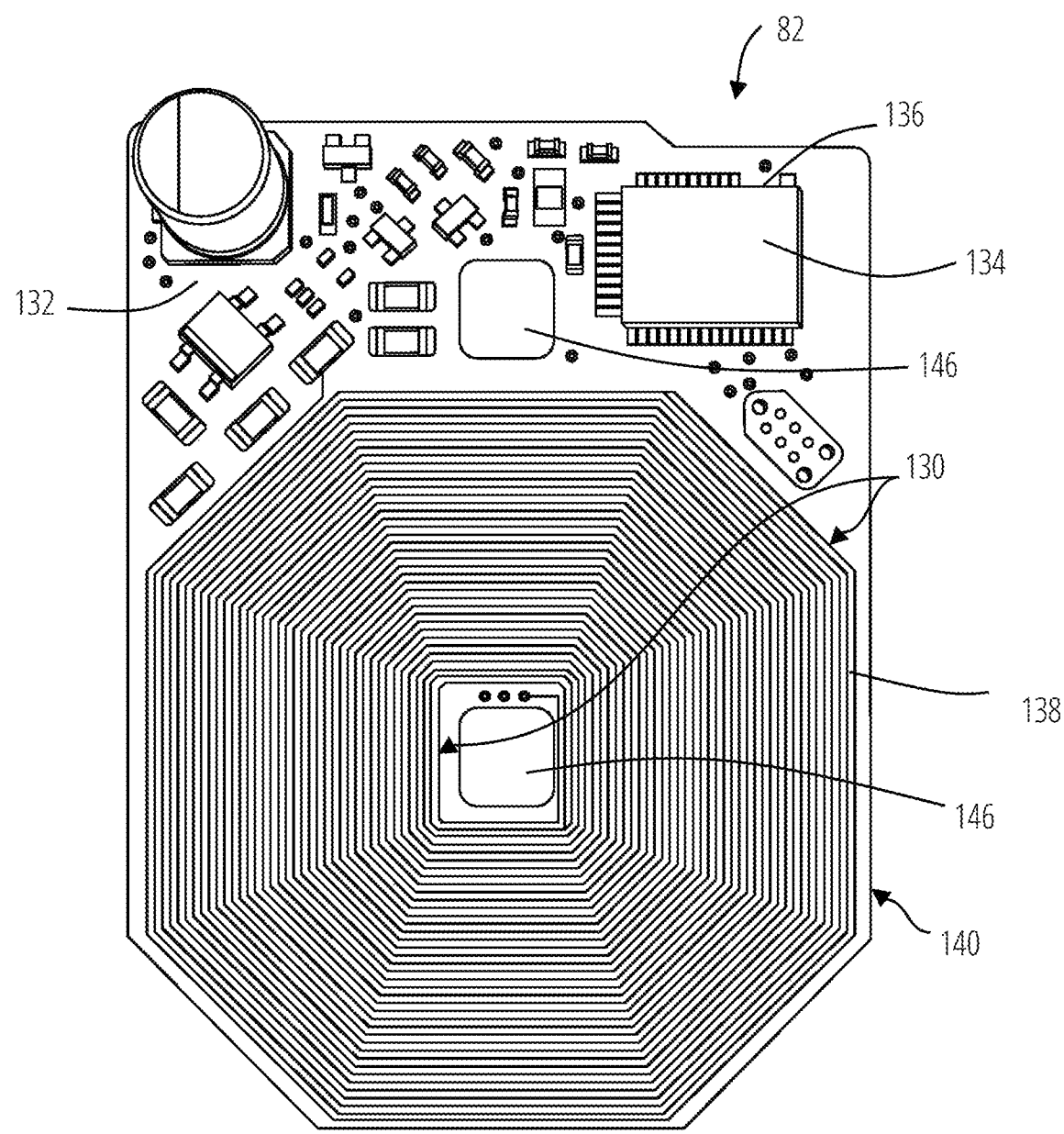
FIG. 6 is front view of an exemplary integrated device that may be used with the internal combustion engine assembly shown in FIGS. 2 and 3.
Figure 7:
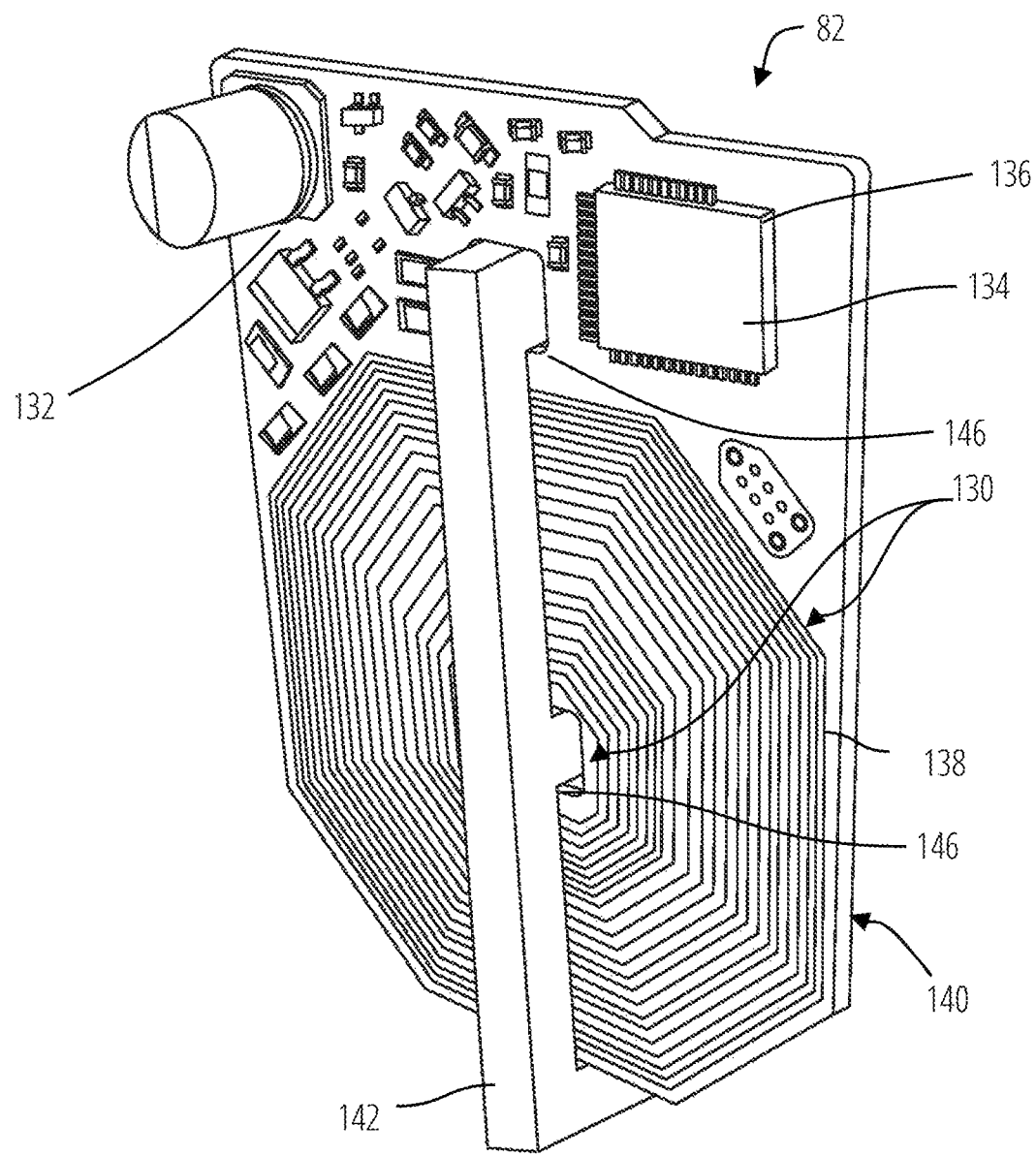
FIG. 7 is a perspective view of the integrated device shown in FIG. 6 with a pole piece installed.

In the exemplary embodiment, the integrated device 82 includes a housing 128 that is shaped and sized to be removably coupled to the cover. The integrated device 82 includes a printed circuit board 140 with a power generation portion 130, a power conditioner 132, a microcontroller 136 and a wireless communication module 134, such as a Bluetooth module, contained within the housing 128. The microcontroller 136 and the wireless communications module 134 may be combined into one chip, as shown in FIGS. 6 and 7. The combined chip is referred to as a system-on-a-chip (SoC) and is known in the field. In the exemplary embodiment, the wireless communications module 134 of the integrated device 82 is capable of communication to a remote device (not shown), such as, but not limited to a phone, a laptop, a smart watch, a server system or a web server.

Moreover, the wireless communication module 134, may include, for example, a wired or wireless network adapter or a wireless data transceiver for use with a mobile phone network (e.g., Global System for Mobile communications (GSM), 3G, 4G, 5G, NB-IoT, LTE Cat-M1, or EC-GSM) or other mobile data network (e.g., Worldwide Interoperability for Microwave Access (WIMAX)). Alternatively, the wireless communication module 134, may transmit the data using any wireless communication protocol that enables device 82 to function as described herein, including, but not limited to, long term evolution (LTE), Wi-Fi, Bluetooth, Z-wave, Zigbee, and/or 60 Ghz, for example. In other alternative embodiments, the wireless communication module 134, may transmit the data using other wireless communication protocols including, but not limited to, radio, infrared, ultrasonic, and/or near-field communication (NFC). In further embodiments, alternatively, or in addition, to enable a user to receive data, integrated device 82 may be communicatively coupled to a hardware data link connection, such as a LAN connection, a CAN connection, an AUX connection, and/or a USB connection.

Power generation portion 130 harvests energy from the magnetic portion 112 of the flywheel 108 during engine operations. More specifically, as flywheel 108 and magnetic portion 112 are rotated during engine operation, a time variable magnetic field is present around the circumference of flywheel 108. Moreover, rotation of flywheel 108 causes magnetic portion 112 to rotate past the power generation portion 130, and the changing magnetic field induces a voltage in the power generation portion 130. More specifically, the relative location between power generation portion 130 and flywheel 108 facilitates integrated device 82 being subjected to the maximum available transient change in magnetic field for lawnmower 10, as shown in FIGS. 3 and 11.

The voltage induced in power generation portion 130 powers other electronics coupled to a printed circuit board 140 of the integrated device 82 without the use of a supplemental battery. Because of the flywheel 108 construction, power is generated in bursts when the magnetic portion 112 passes the integrated device 82. Power conditioner 132 facilitates rectifying the harvested energy and maintaining a useable voltage. The power conditioner 132 may be comprised of a capacitor, a rectifier, or a voltage regulator. Because the integrated device 82 is powered when engine 20 is operating, no additional sensors are coupled to lawnmower 10 to determine when the engine 20 is operating. The microcontroller 136 is known in the field and may be used measure, store, and/or maintain a log of usage-based data or operating data, including a log of operating hours. Moreover, the microcontroller 136 stores the usage data in non-volatile memory periodically, or when engine 20 is being shut down. The wireless communications module 134 is known, and transmits or broadcasts usage data to a remote device (not shown). In other embodiments, the microcontroller 136 may also, or in the alternative, measure engine speed, interpret sensor data, and/or store operating data. In further embodiments, the microcontroller 136 may also, or in the alternative, measure acceleration, measure angular displacement, and/or measure angular acceleration associated with engine 20. In alternative embodiments, an accelerometer and/or a gyroscope may also be coupled within the integrated device 82.

During operation, usage-based or operating data is transmitted from lawnmower 10 to a remote device, such as a mobile device, or to a cloud-based storage system. The combination of the construction of the cover 100 and the relative proximity of components on lawnmower 10, enables the integrated device 82 to operate, be energized, and gather usage data without a supplemental battery being coupled to the integrated device 82. Moreover, because the integrated device 82 operates when the engine 20 is operating, no additional sensors, including accelerometers, are required to determine operation of the engine 20.

It should be noted that although the integrated device 82 is described herein as being coupled adjacent to flywheel 108, alternatively, integrated device 82 may be coupled adjacent to any rotating component that includes an attached magnet and/or a rotating magnetic field. The rotating component may be part of a powered device, such as a motor shaft, or part of a non-powered, passively rotating device, such as a shaft, spindle, or wheel. For example, in alternative embodiments, integrated device 82 may be coupled adjacent to an induction motor, a rotating shaft, and/or a magnetic sphere. Moreover, in other alternative embodiments, integrated device 82 may be coupled in a position to receive a magnetic field generated from a non-permanent magnet source, such as for example, an electromagnet, and/or an electromagnetic field source such as a coil winding, an armature, or a stator winding that is part of the engine 20.

In the exemplary embodiment of FIG. 6, the integrated device 82 includes a printed circuit board 140. A power generation portion 130 (shown in FIG. 6), is integrated with the printed circuit board 140 which includes a plurality of electronic components, such as, for example, the power conditioner 132, the microcontroller 136, and the wireless communications module 134, also shown in FIG. 6. More specifically, because of the orientation of the printed circuit board 140, the power generation portion 130 is adjacent to the flywheel 108. The power conditioner 132, the microcontroller 136 and the wireless communications module 134 are a distance above or below flywheel 108. It may be desirable to place the electronic components above the flywheel for less exposure to heat from the engine, as shown in FIG. 11. Additionally, the electronic components may be placed on the opposite side of the printed circuit board 140 away from the flywheel 108 or mounted on a separate circuit board and mounted remotely.

Power generation portion 130 may have any shape and includes a trace winding pattern 138 which enables it to harvest energy to power other components on the integrated device 82 to function as described herein. Moreover, in the exemplary embodiment, power generation portion 130 is defined by multiple electrically conductive layers 144 that are substantially planar. Embedding the trace winding pattern 138 to mimic a wound wire coil is known in the industry. The trace winding pattern 138 shown in FIG. 6 may vary; however, the wound trace of the trace winding pattern 138 may be 0.15 mm wide and include a gap of 0.15 mm between each trace. The trace winding pattern 138 in each of the multiple electrically conductive layers 144 are connected. The layers/trace are connected to each other by a feature called a "via" (not shown) which is a drilled hole that is copper plated and connects to the trace winding pattern 138 of each of the multiple electrically conductive layers 144.

Figure 10:
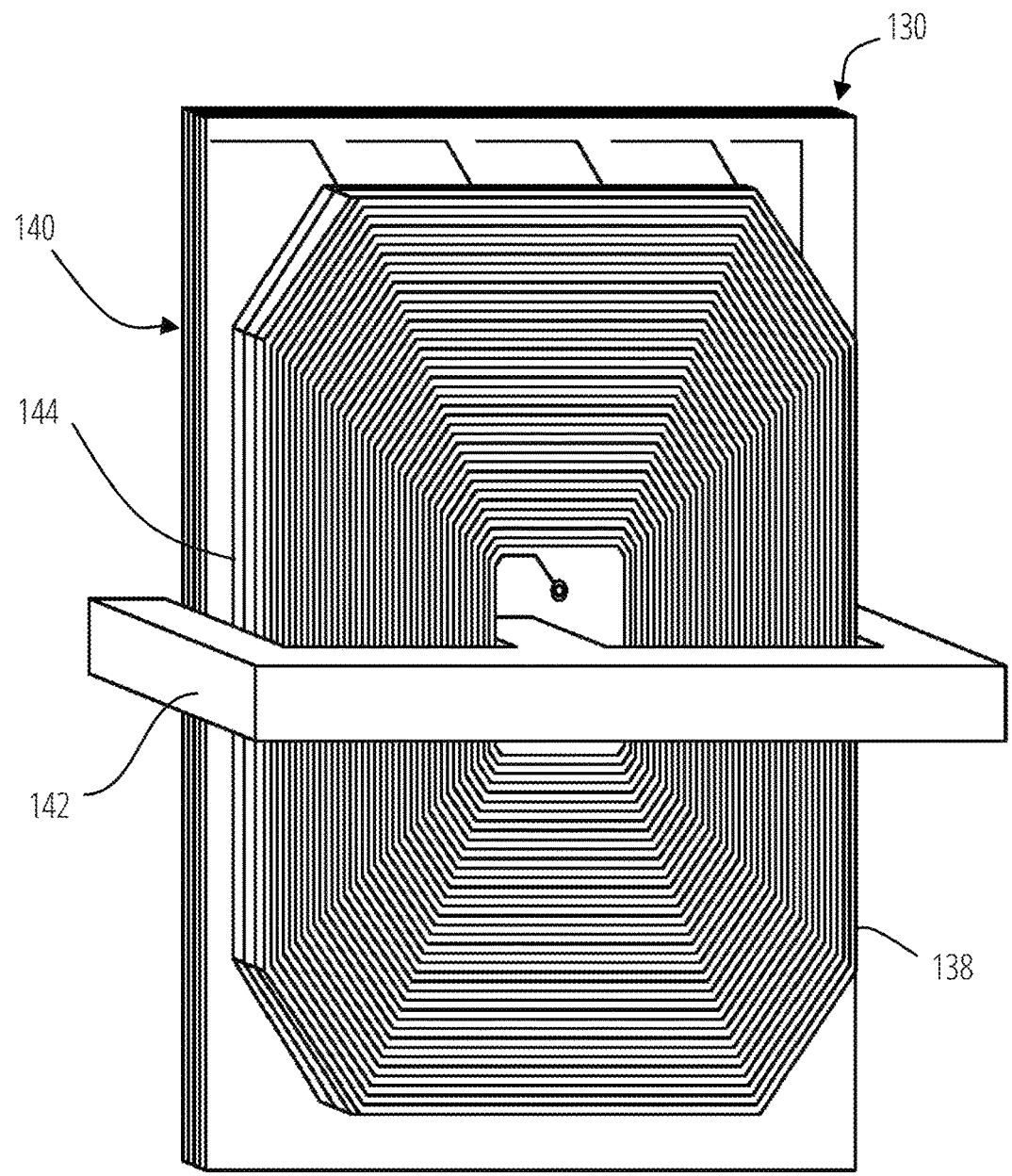
FIG. 10 is a perspective view of the power generation portion of the integrated device shown in FIG. 9 with a pole piece installed.
Figure 15:
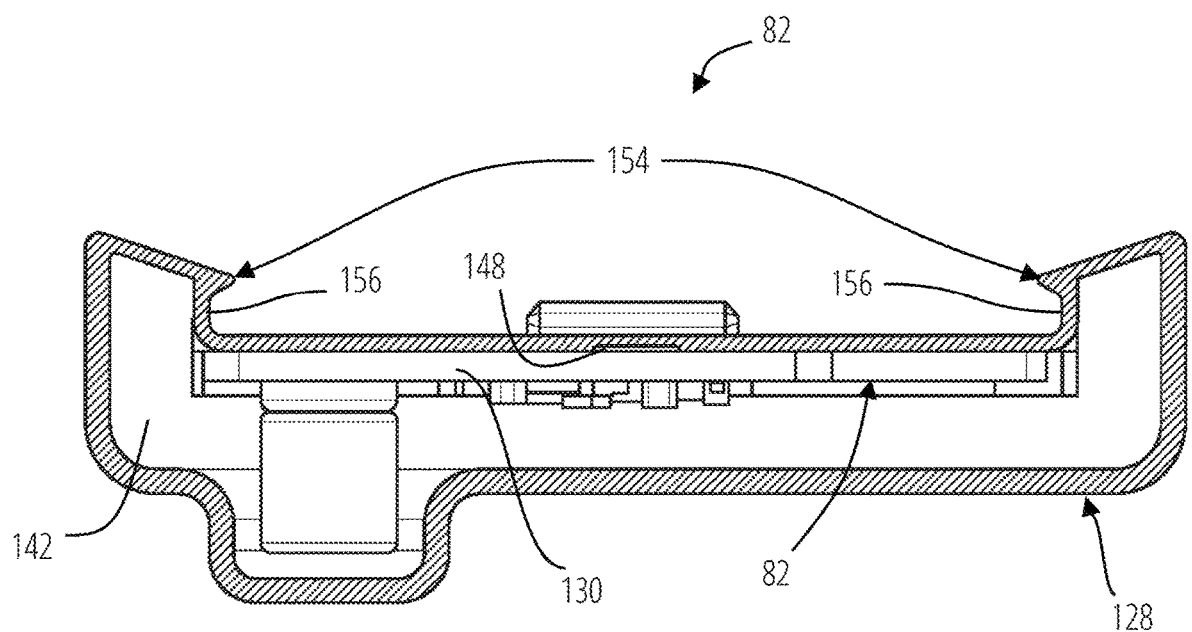
Figure 19:
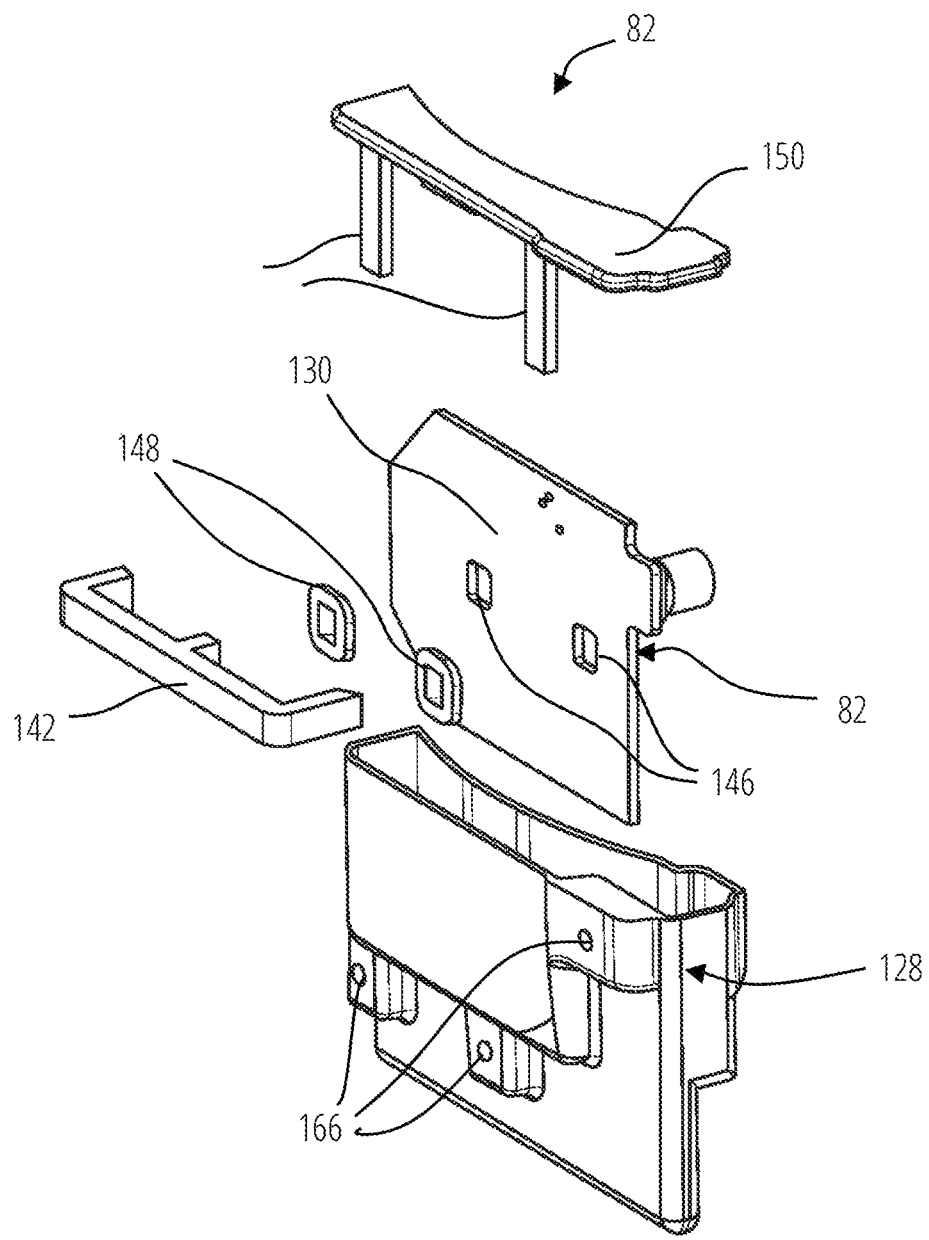
FIG. 19 is an exploded view of the integrated device shown in FIG. 5.

FIG. 7 is a perspective view of the integrated device 82 shown in FIG. 6 with a pole piece 142 installed. Power generation portion 130 may include the pole piece 142, shown in FIGS. 7 and 10 to direct and concentrate the magnetic field passing through the power generation portion 130. For example, if the power generation portion 130 cannot harvest enough energy from the passing magnetic field, the pole piece 142 is installed to act as a magnetic flux concentrator to gather more energy. The pole piece 142 is shown installed in a length-wise position with the integrated device 82 in FIG. 7; however, it may also be installed in the width-wise position, as shown in FIG. 10. The integrated device 82 is mounted such that the primary flat plane of the pole piece 142 is perpendicular to the rotational axis of the flywheel 108. Additionally, the pole piece 142 may be installed into an opening 146 in the printed circuit board, as shown in FIGS. 7 and 10. The opening 146 may include a bushing 148, as shown in FIGS. 15 and 19 to secure and protect the printed circuit board 140. The pole piece 142 is manufactured using a soft magnetic material such as iron or soft magnetic powdered metal in order to maximize the magnetic performance.

Figure 8:
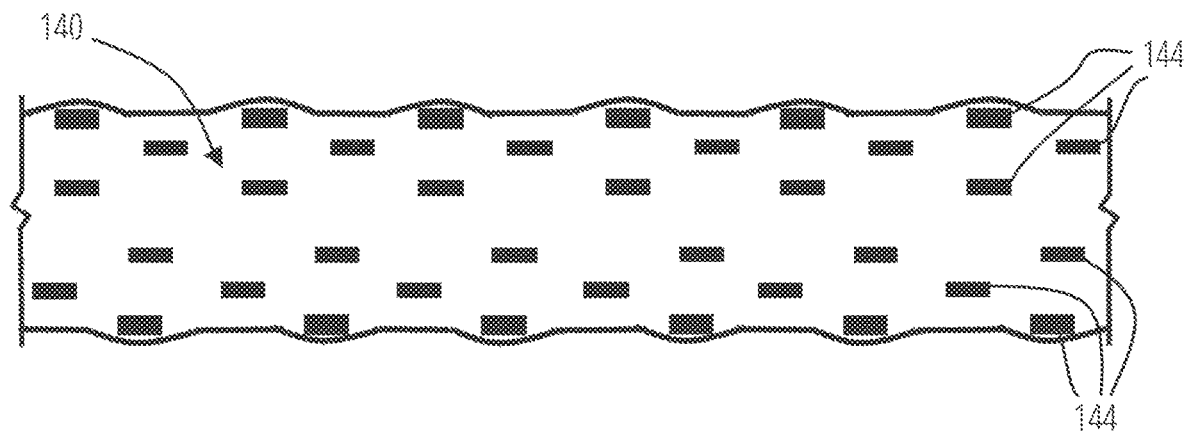
FIG. 8 is partial cutaway view of the power generation portion of the integrated device.

FIG. 8 is partial cutaway view of the power generation portion 130 of the integrated device 82 showing copper embedded multiple electrically conductive layers 144. The multiple copper layers may be embedded with printed circuit board 140 while maintaining the overall width of the printed circuit board, shown in FIGS. 6, 7 and 8. The printed circuit board 140 includes multiple electrically conductive layers 144, such as six total layers as shown in FIG. 8. The thickness of the copper layers may be thicker on the outside layers, such as 0.070 mm. The inside copper layers may be thinner, such as 0.035 mm thick. The differing thickness between the outside copper layers and inside cooper layers and orientation is shown in FIG. 8. Alternatively, the copper layers may all be the same thickness.

In the exemplary embodiment, power generation portion 130 is part of the printed circuit board 140 of the integrated device 82. In alternative embodiments, due to space constraints for example, power generation portion 130 may have any other shape, such as square or rectangular, that enables the integrated device 82 to function as described herein. Moreover, in the exemplary embodiment, the power generation portion 130 is defined by multiple electrically conductive layers 144, such as six that are substantially planar. In alternative embodiments, power generation portion 130 may include multiple electrically conductive layers 144 that have a non-planar profile. For example, power generation portion 130 may be formed with an arcuate profile that is curved to substantially match a curvature of an outer surface of flywheel 108.

Figure 9:
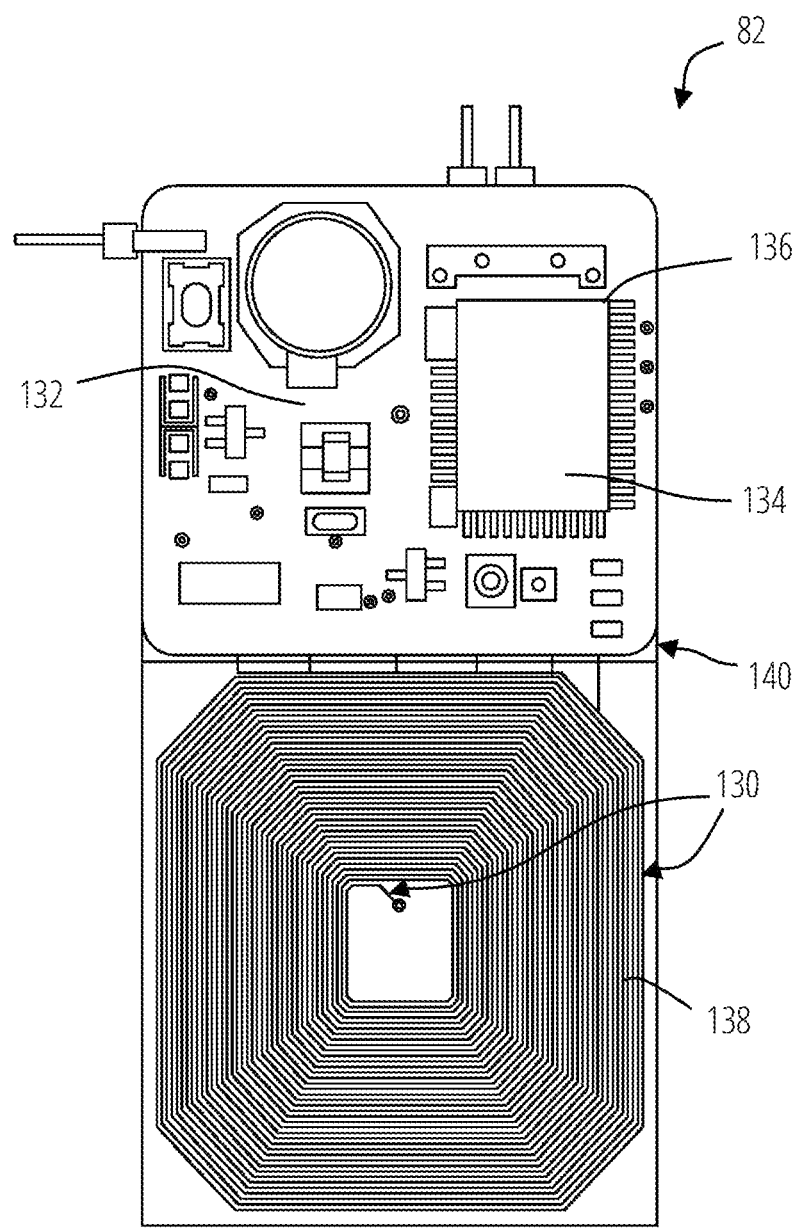
FIG. 9 is front view of an alternative integrated device that may be used with the lawnmower shown in FIGS. 2 and 3.

Alternatively, the multiple electrically conductive layers 144 may be stacked to create a portion of the printed circuit 140 that is thicker as shown in FIGS. 9, 10 and 11. Furthermore, although each trace winding pattern 138 is illustrated as being generally square, the trace patterns may be formed in any other shape that enables the integrated device 82 to function as described herein.

FIG. 9 is a front view of an alternative integrated device 82 that may be used with the lawnmower 10 shown in FIG. 1. FIG. 9 depicts the integrated device 82 with a less compact design where the power generation portion 130 is not overlapping with the electronic components, as shown in FIGS. 6 and 7.

FIG. 10 is a perspective view of the power generation portion 130 of the integrated device 82 shown in FIG. 9 with a pole piece 142 installed. The power generation portion 130 of the printed circuit board 140 includes multiple electrically conductive layers 144 which are stacked. The pole piece 142 is shown in the width-wise position in FIG. 10.

FIG. 11 is a perspective schematic view of a portion of the integrated device 82 that may be used with lawnmower 10 (shown in FIG. 1). In the exemplary embodiments of FIG. 11, the integrated device 82 is coupled to engine 20 to monitor operating data or usage data of engine 20 as described herein. In each embodiment, the orientation of the integrated device 82 relative to flywheel 108 facilitates enhancing and maximizing the magnetic field strength from the magnetic portion 112.

Figure 12:
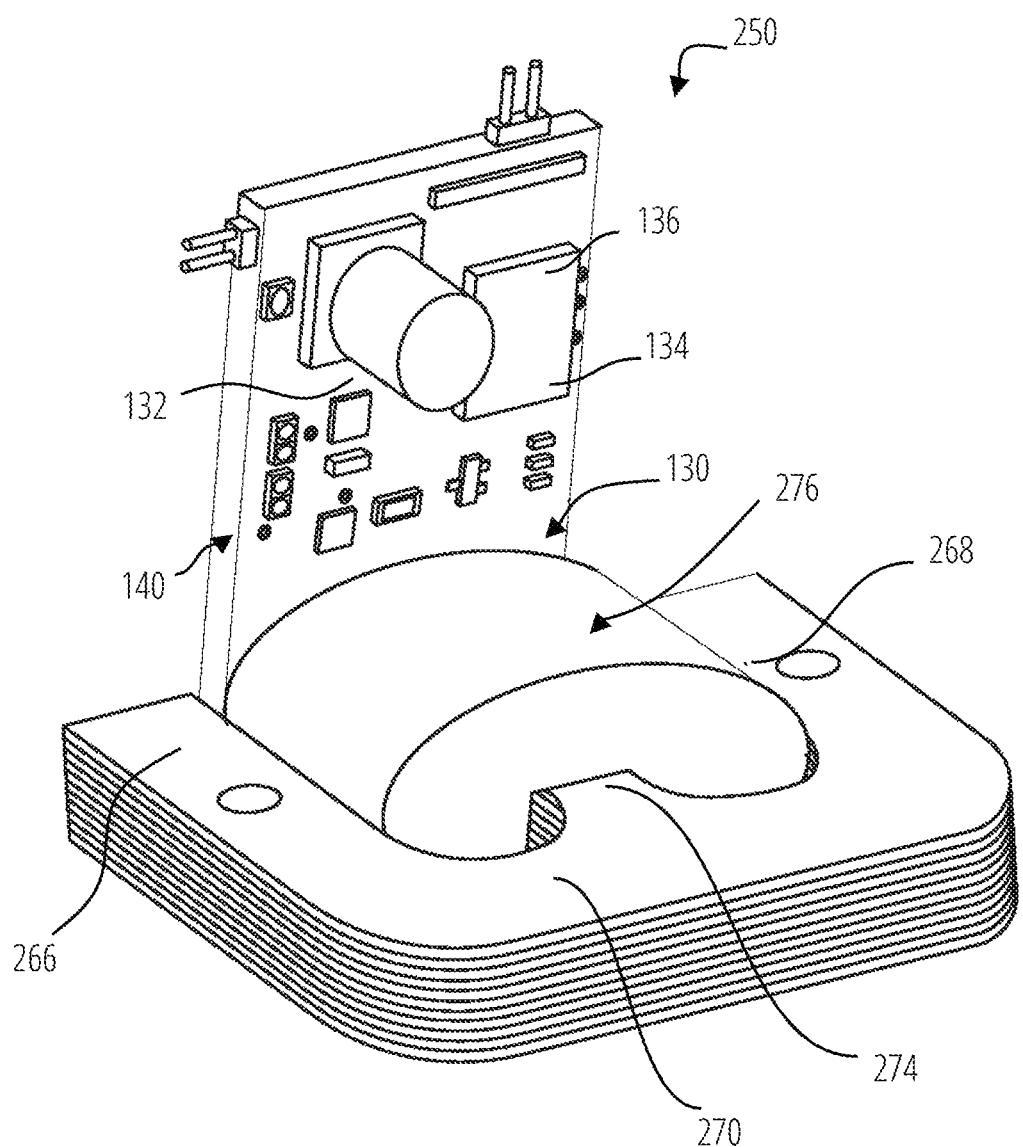
FIG. 12 is a perspective schematic view of a portion of an ignition coil assembly that may be used with the internal combustion engine shown in FIGS. 2 and 3.

FIG. 12 is a perspective schematic view of a portion of an ignition coil assembly 250 that may be used with internal combustion engine assembly 80 (shown in FIGS. 2 and 3). Within ignition coil assembly 250, the power generation portion 130 of the integrated device 82 is coupled to an ignition coil 276. More specifically, ignition coil assembly 250, includes a pair of stator legs 266 and 268 that extend outward from a main body portion 270. A primary magnetic circuit leg member 274 also extends outward from stator main body portion 270 such that the primary magnetic circuit leg member 274 is substantially centered between stator legs 266 and 268. The ignition coil 276 is wound about magnetic circuit leg member 274.

The ignition coil assembly 250 includes the power generation portion 130 of the integrated device 82 coupled to the ignition coil 276, as shown in FIG. 12. Moreover, the remainder of the printed circuit board 140 of the integrated device 82 may extend above or below the power generation portion 130. In alternative embodiments, the ignition coil assembly 250 may have any other configuration or shape that enables it to function as described herein.

Figure 13:
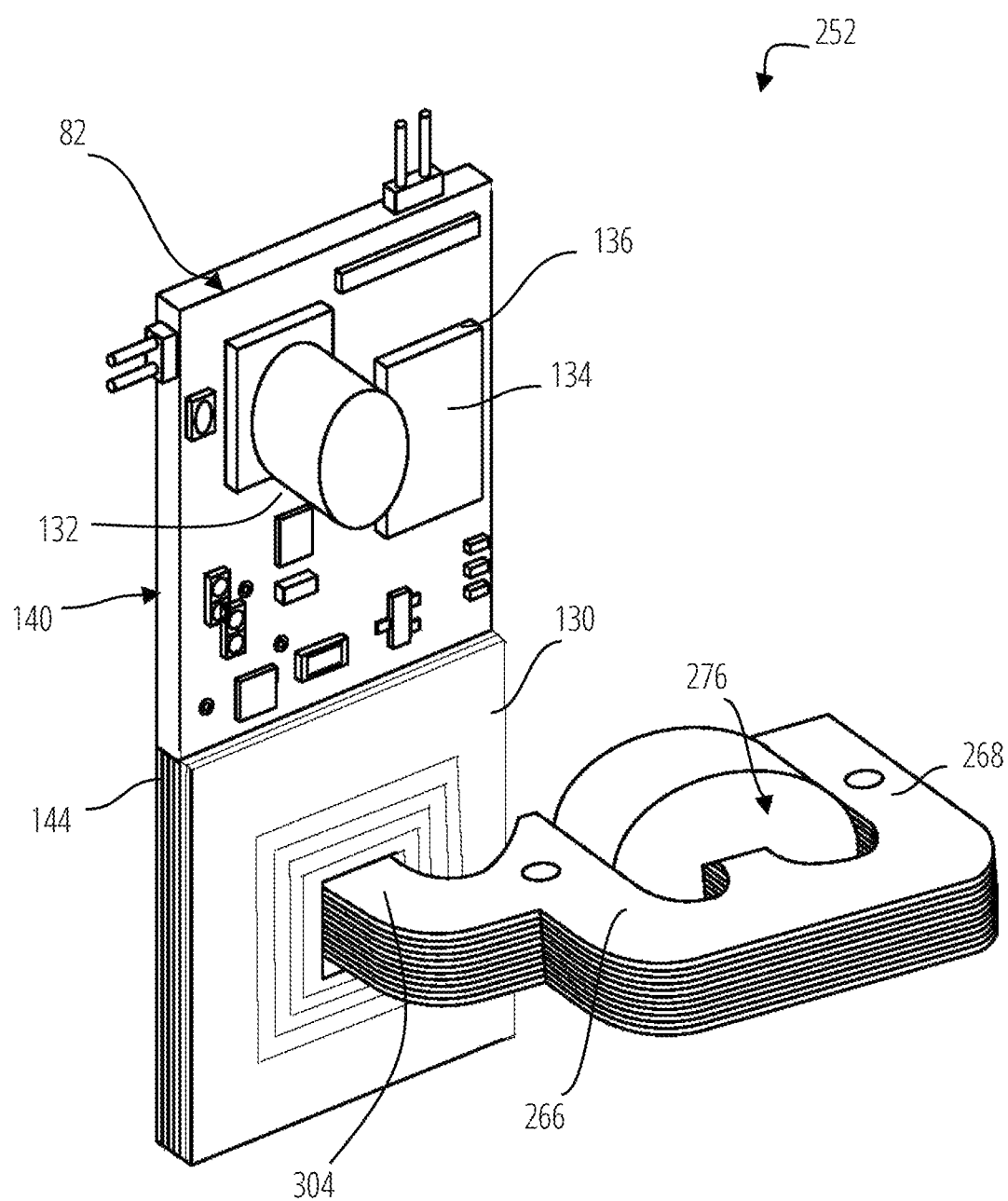
FIG. 13 is a perspective schematic view of a portion of an alternative ignition coil assembly that may be used with the internal combustion engine shown in FIGS. 2 and 3.

In another embodiment, the integrated device 82 may be coupled to a supplemental stator bar 304 of an alternative ignition coil assembly 252 as shown in FIG. 13. FIG. 13 is a perspective schematic view of a portion of the alternative integrated ignition coil assembly 252 that may be used with the internal combustion engine assembly 80. For example, in the embodiment shown in FIG. 13, a power generation portion 130 of the integrated device 82 is coupled to the supplemental stator bar 304 that extends outward from one of stator legs 266 or 268, rather than the power generation portion 130 being coupled to the ignition coil 276, as shown in FIG. 12. In each embodiment, the power generation portion 130, harvests energy during engine operations. The voltage induced in the power generation portion 130 powers the wireless communications module 134 and other electronics coupled to the integrated device 82 thereto without the use of a supplemental battery.

Figure 14:
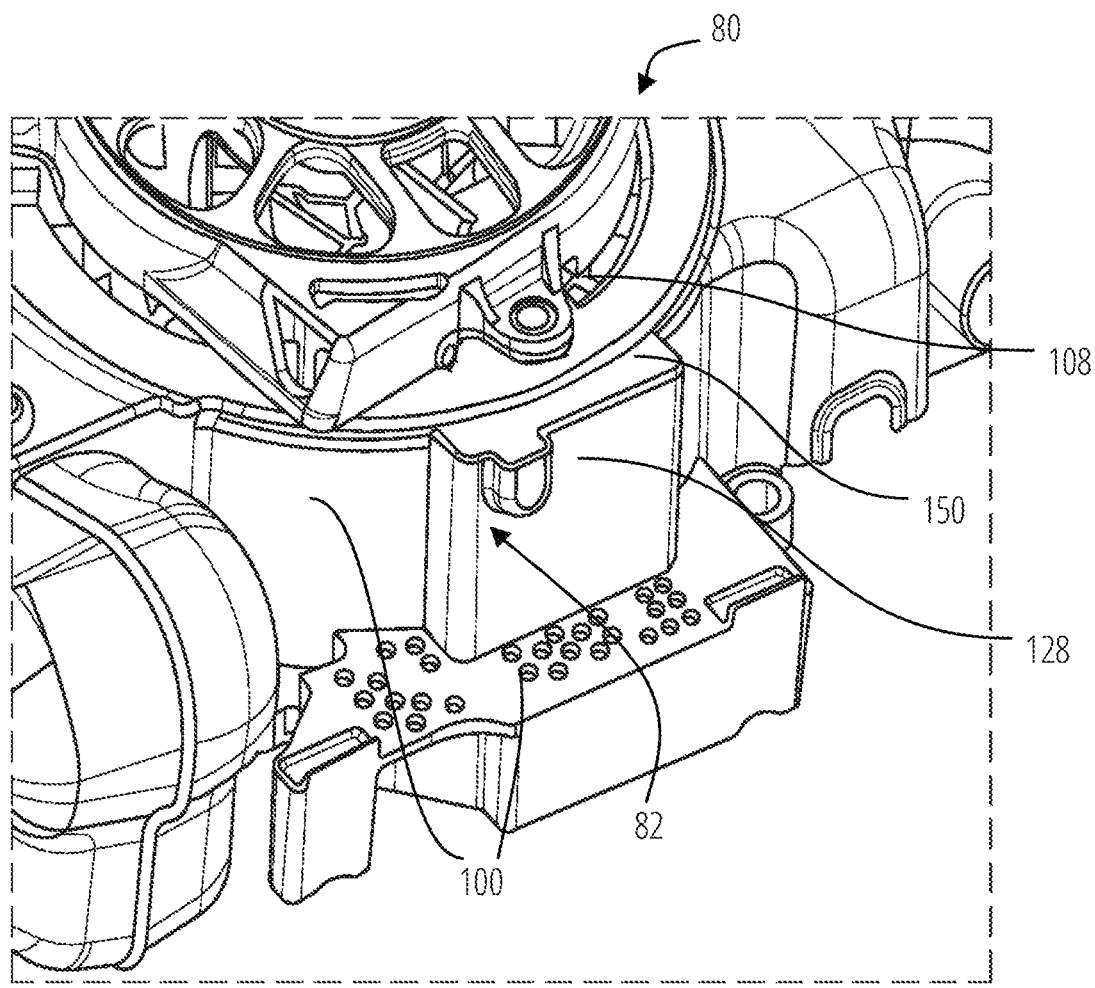
FIG. 14 is a perspective view of the internal combustion engine assembly shown in FIG. 2 with the top cover removed and the integrated device attached to the cover.
Figure 16:
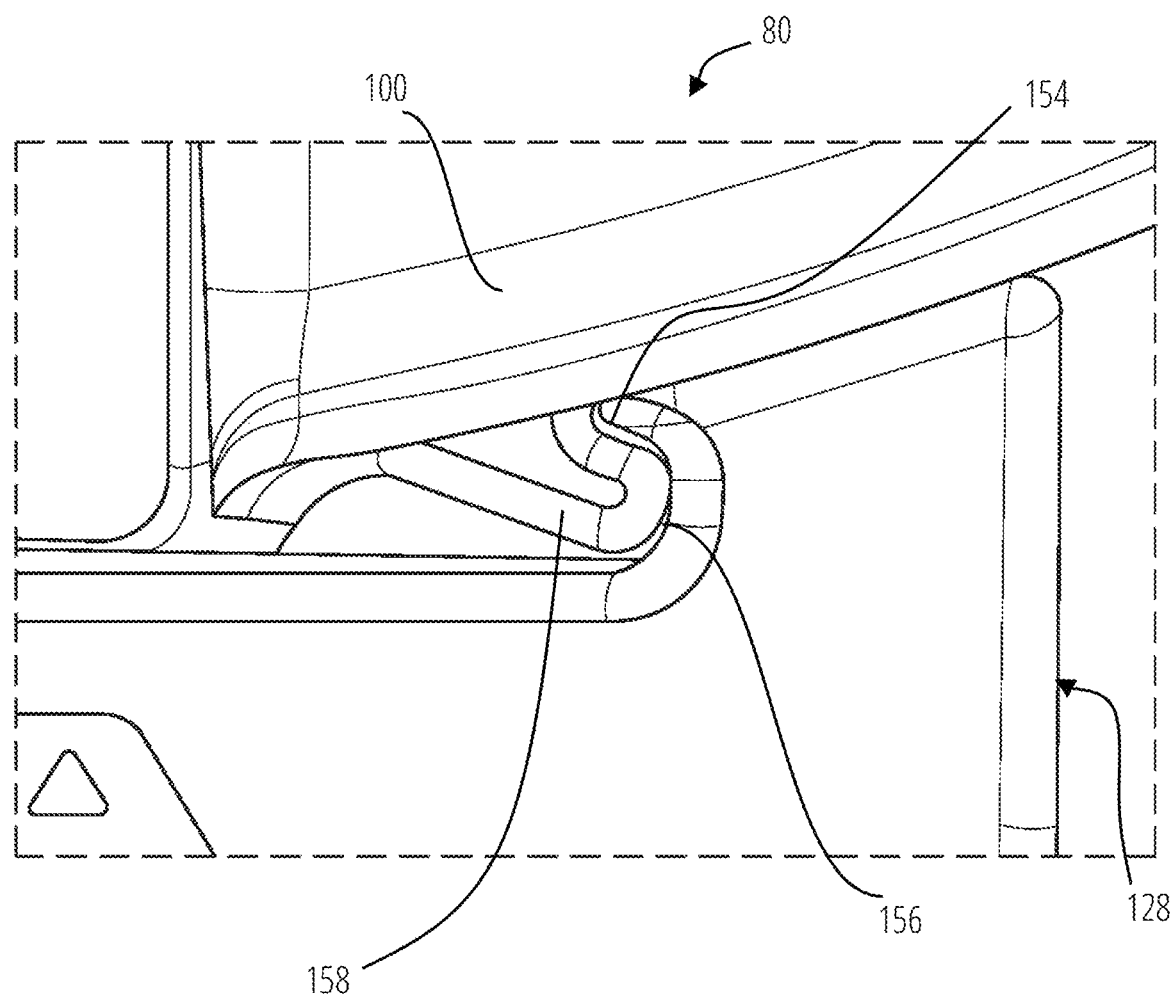
FIG. 16 is a top view of a portion of a dovetail joint attaching the integrated device to the internal combustion engine assembly shown in FIG. 14.

FIG. 14 is a perspective view of the internal combustion engine assembly 80 shown in FIG. 2 with the top cover 98 removed and the integrated device 82 attached to the cover 100. The integrated device 82 includes an interlocking connection, such as, a dovetail joint 154, as shown in FIGS. 15, and 16. FIG. 15 is a cutaway top view of the housing 128 of the integrated device 82 shown in FIG. 14. The housing 128 may be shaped to conform to the profile of the integrated device 82. In FIG. 15, the housing 128 conforms the profile of the integrated device 82 with the pole piece 142 installed in a width-wise position relative to the printed circuit board 130. The dovetail joint 154 is formed by extending the profile of the housing 128 around the pole piece 142 a small amount and using a radial curve 156 towards the printed circuit board 130. The pole piece 142 is positioned in the housing 128 to be adjacent to flywheel 108 and to conform to the radius of the flywheel 108. By conforming to the radius of the flywheel 108, the pole piece 142 maintains a consistent gap between the pole piece 142 and the flywheel 108 as the flywheel 108 rotates.

FIG. 16 is a top view of a portion of the dovetail joint 154 securing the integrated device 82 to the internal combustion engine assembly 80 shown in FIG. 14. The cover 100 of the of the internal combustion engine assembly 80 includes a locating rail 158. The locating rail 158 is shaped and sized to receive the dovetail joint 154 and secure it to the cover 100 to create an interlocking connection. The housing 128 is installed to the cover 100 by aligning the dovetail joint 154 to the locating rail 158 and sliding downward to create an interlocked connection. The amount of downward travel may be limited by a stepped portion 160 of the housing 128 as shown in FIG. 18. The stepped portion contacts the cover 100, as shown in FIGS. 14 and 17.

Figure 17:
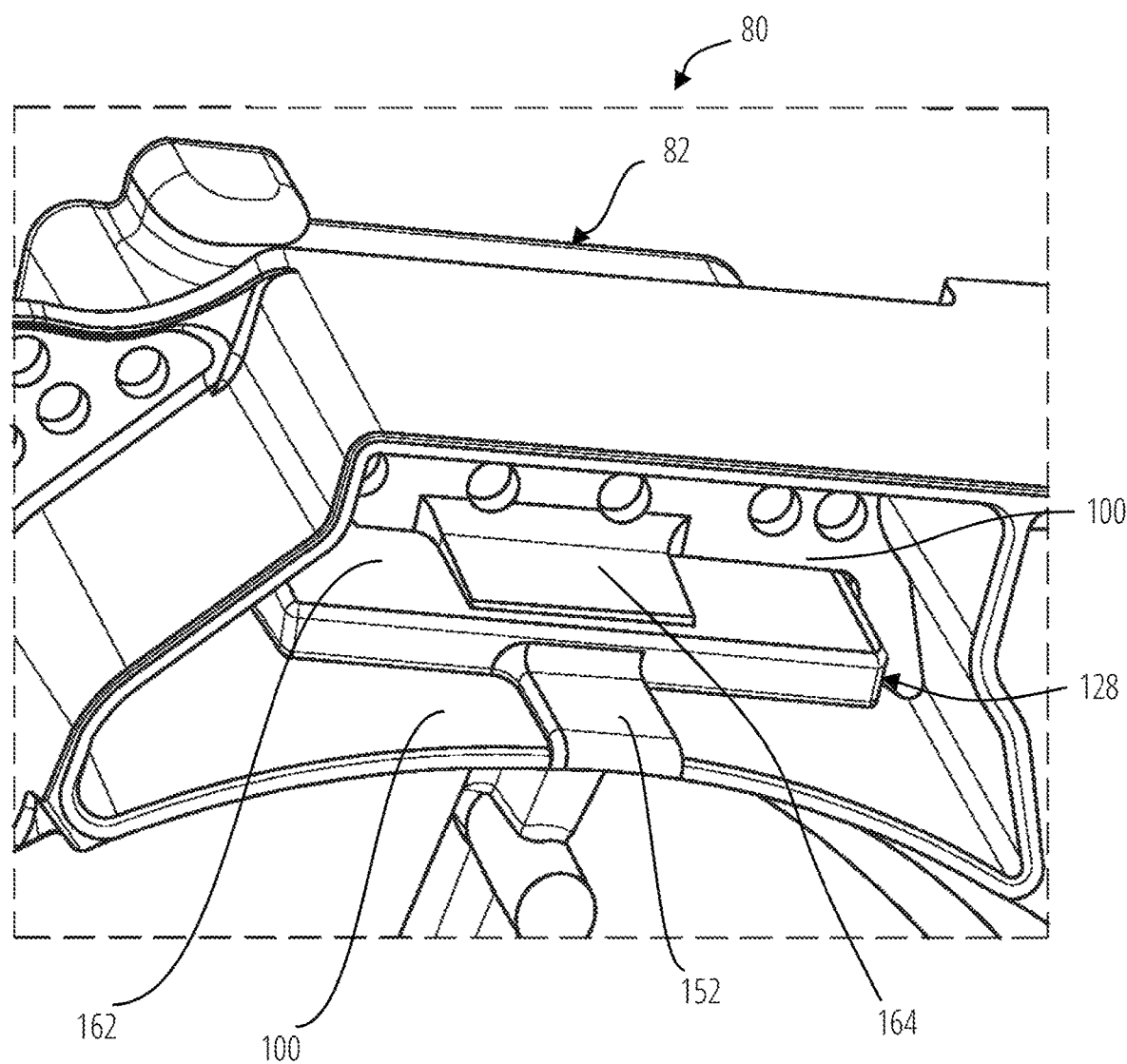
FIG. 17 is a perspective view of the integrated device attached with a snap-fit and a retainer.
Figure 18:
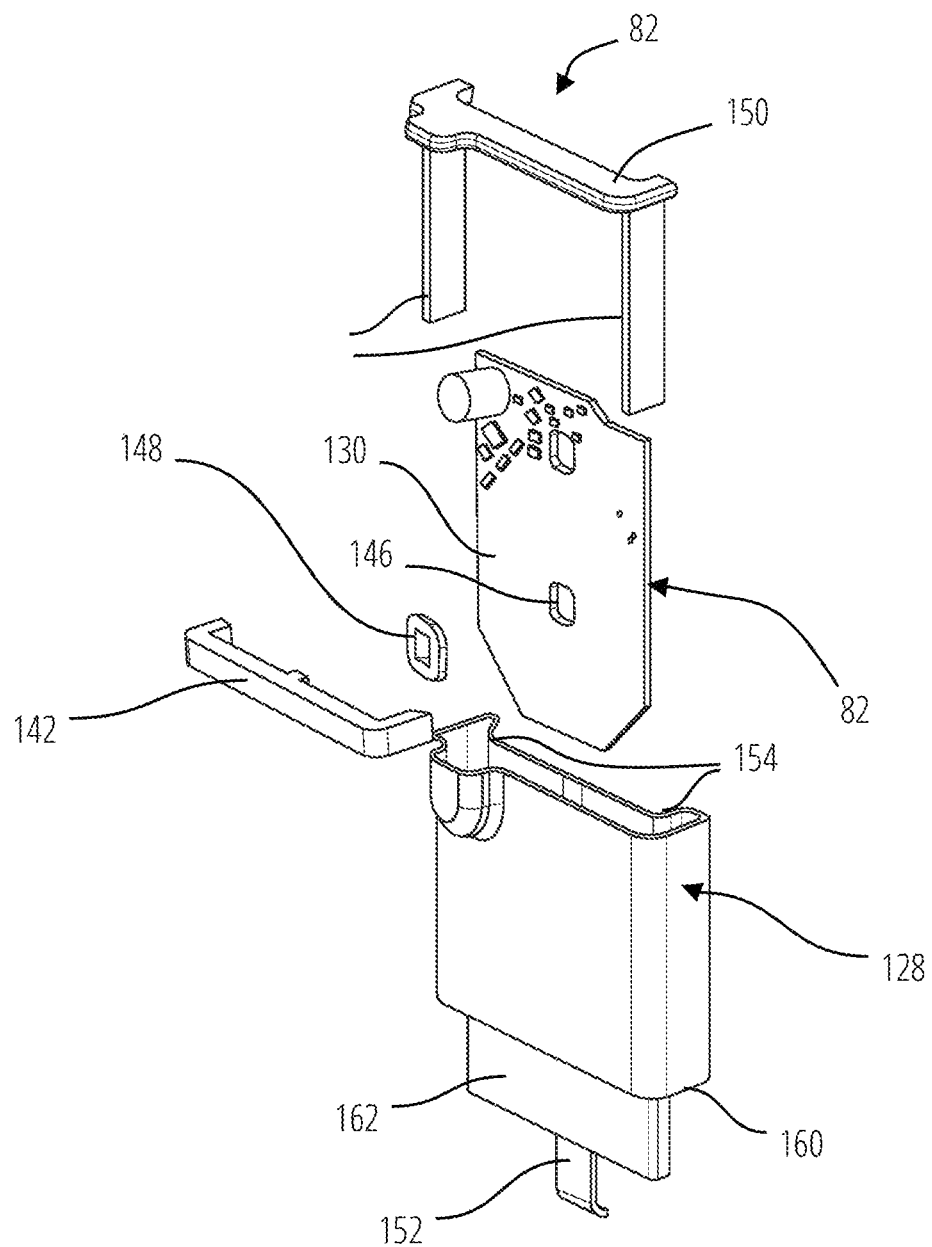
FIG. 18 is an exploded view of the integrated device shown in FIG. 14.

FIG. 17 is a perspective view of the integrated device 82 attached with a snap-fit 152 and a retainer 164. A bottom portion 162 of the housing 128 is secured by attaching the snap-fit 152 to the cover 100. The snap-fit 152 of the housing 128 is curved to allow it to snap or hook to the cover. The retainer 164 is part of the cover 100 and secures the housing 128 with an interference fit. For example, the retainer 164 may be angled towards the housing 128 to force contact between the two. FIGS. 14 through 17 demonstrated how the housing 128 may removably attached to the engine assembly 80 without the use of mechanical fasteners. Any one attachment method or combination of attachment methods shown in FIGS. 14-17 may be used. For example, the interlocked connection created by the dovetail joint 154 of the housing 128 and the locating rail 158 of the cover 100 may be used on its own or in combination with the snap-fit 152 of the housing 128 to the cover 100 or the interference fit of the retainer 164 of the cover 100 against the housing 128.

Figure 20:
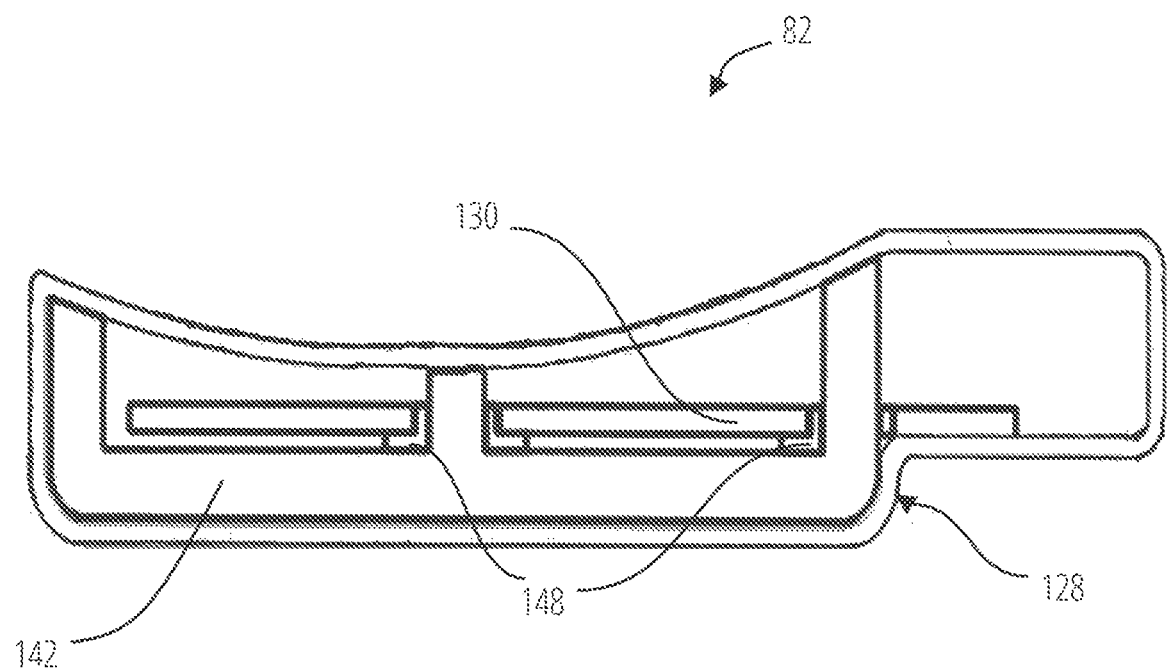
FIG. 20 is a top view of the integrated device shown in FIG. 19 without a removable portion.

FIG. 18 is an exploded view of the integrated device 82 shown in FIG. 14. The housing 128 is profiled and sized to secure the integrated device 82 with a minimal gap between its inside surfaces and the integrated device 82. The pole piece 142 is more tightly secured to the printed circuit board 130 by inserting a bushing 148 into the opening 146. The bushing 148 may be wider on the insertion side of the opening 146 to protect the printed circuit board 130, as shown in FIG. 20. The bushing 148 is envisioned to me made of plastic resin, rubber, or synthetic rubber, but a variety of materials which do not interfere with the operation of the integrated device 82 may be used. The housing 128 may include a removable portion 150. The removable portion 150 may be coupled to the housing 128 with a snap-fit. Alternatively, any other coupling means may be used, including removable adhesives or epoxy that enables the removable portion 150 to be removed. In other alternative embodiments, the removable portion 150 may be permanently attached to the housing 128 by welding. In another alternative embodiment, removable portion 150 may be omitted and the printed circuit board 130 and other internal components could be affixed and protected by filling the housing 128 with a permanent resin potting compound.

The removable portion may include posts 170 for insertion inside the housing 128. The posts 170 may be spaced so they contact a surface of the pole piece 142 and provide additional securement of the pole piece 142 in the housing 128. For example, in FIG. 18, the posts 170 contact two surfaces of the pole piece 142 and limits horizontal movement.

FIG. 19 is an exploded view of the integrated device 82 shown in FIG. 5. The housing 128 of the integrated device 82 may be installed to the inner surface of the 104 of the cover 100 and in a horizontal orientation relative to the cover 100, as shown in FIG. 5. Additionally, the pole piece 142 may be installed in a length-wise position relative to the printed circuit board 130, as shown in FIGS. 7 and 19. As a result, an additional opening 146 and bushing 148 may be used to secure the pole piece 142 to the printed circuit board 130. In FIG. 19, the posts 170 are designed to be inserted inside the housing 128 and contact a surface of the pole piece 142 to prevent the pole piece from moving out of the bushing 148.

Mounting holes 166 may be used to attach the integrated device 82 to an inner surface 104 (FIG. 5) of the cover 100. It is envisioned that mechanical fasteners 168 (FIG. 5) may include screws, anchor bolts, studs, or threaded fasteners that are inserted through holes (not shown) in the cover 100 that align to the mounting holes 166 of the housing 128. The mechanical fasteners 168 are sized to only travel into the housing 128 a predefined distance to avoid damaging the components of the integrated device 82. Similar to FIG. 18, the horizontal orientation of the housing 128 shown in FIG. 19 may include a removable portion 150.

The removable portion 150 may be coupled to the housing 128 with a snap-fit. Alternatively, any other coupling means may be used, including removable adhesives or epoxy that enables the removable portion 150 to be removed. In other alternative embodiments, the removable portion 150 may be permanently attached to the housing 128 by welding. In another alternative embodiment, removable portion 150 may be omitted and the printed circuit board 130 and other internal components could be affixed and protected by filling the housing 128 with a permanent resin potting compound.

FIG. 20 is a top view of the integrated device 82 shown in FIG. 19 without a removable portion 150. FIG. 20 shows bushing 148 wider on the insertion side to protect the printed circuit board 130. Additionally, FIG. 20 shows how the housing 128 is curved to conform to the profile of the flywheel 108 and keep a consistent distance between the pole piece 142 as the flywheel 108 rotates.

The above-described power tool uses an internal combustion engine coupled to an integrated device that is cost-effective to manufacture and assemble, and that facilitates reducing the number of components, and the complexity of components necessary to monitor usage data associated with the internal combustion engine. Moreover, the integrated device described herein does not receive power primarily from a battery. Furthermore, the integrated device described herein could be flexible and adaptable for use with power tools and power equipment other than lawnmowers that includes an internal combustion engine.

Exemplary embodiments of power tools and more specifically, mower architecture are described above in detail. Although the mower architecture are herein described and illustrated in association with a walk-behind lawnmower, the invention is also intended for use on commercial walk-behind mowers, power tools and power equipment that include an internal combustion engine. Moreover, it should also be noted that the components of the invention are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power tool comprising:
an internal combustion engine comprising a flywheel with a magnetic portion and a cover;
an integrated device comprising a printed circuit board with a power generation portion enclosed in a housing; and
the housing is secured in close proximity to the flywheel such that the integrated device generates power wirelessly from the flywheel when the internal combustion engine is operating, the housing configured to be removably attached to the cover such that the housing is slidably coupled to the cover.

2. A power tool in accordance with claim 1 wherein the integrated device is not primarily powered by a battery.

3. A power tool in accordance with claim 1 wherein the integrated device comprises at least one of:
a sensor for at least one of measuring acceleration, measuring angular displacement, and measuring angular acceleration;
a microcontroller for at least one of measuring operating time, measuring engine speed, interpreting sensor data, storing operating time, storing operating data, and maintaining a log of operating hours; and a wireless communications module for broadcasting operating data gathered from the internal combustion engine.

4. A power tool in accordance with claim 1 wherein the integrated device includes a pole piece to direct and concentrate the magnetic field passing through the power generation portion.

5. A power tool in accordance with claim 4 wherein the housing conforms to and secures the pole piece in a position that is adjacent to the flywheel.

6. A power tool in accordance with claim 4 wherein the printed circuit board includes an opening for inserting the pole piece.

7. A power tool in accordance with claim 6 wherein the opening includes a bushing.

8. A power tool in accordance with claim 1 wherein the housing is attached to the cover of the internal combustion engine without the use of mechanical fasteners.

9. A power tool in accordance with claim 1 wherein the housing is coupled to the cover with at least one of:
  a snap-fit;
  an interference fit; and
  an interlocking connection.

10. A power tool in accordance with claim 1 wherein the housing is attached to an inside surface of the cover using mechanical fasteners.

11. An engine assembly comprising:
  an internal combustion engine comprising a flywheel with a magnetic portion and a cover;
  an integrated device capable of receiving power wirelessly from the internal combustion engine when the flywheel is rotating; and
  the integrated device is secured in a housing that is removably attached to the cover of the engine assembly such that the housing is slidably attached to the cover.

12. An engine assembly in accordance with claim 11 wherein the integrated device includes a printed circuit board comprising:
  a power generation portion configured to harvest energy from movement of the flywheel;
  a power conditioner configured to maintain a useable voltage for the integrated device as the flywheel rotates;
  a microcontroller for at least one of measuring operating time, measuring engine speed, interpreting sensor data, storing operating time, storing operating data, and maintaining a log of operating hours; and
  a wireless communications module configured to broadcast operating data.

13. An engine assembly in accordance with claim 11 wherein the integrated device is not primarily powered by a battery.

14. An engine assembly in accordance with claim 11 wherein the integrated device includes a pole piece.

15. An engine assembly in accordance with claim 14 wherein the housing secures the pole piece mounted to the integrated device.

16. An engine assembly in accordance with claim 11 wherein the housing is attached to the cover of the internal combustion engine without the use of mechanical fasteners.

17. An engine assembly in accordance with claim 11 wherein the housing is attached to the cover with at least one of:
  a snap-fit;
  an interference fit;
  an interlocking connection; and
  at least one mechanical fastener.

18. A power tool comprising:
  an internal combustion engine assembly comprising a cover, a rotating component and a source of a magnetic field; and
  an integrated device comprising a printed circuit board with a power generation portion capable of receiving power wirelessly from the source of the magnetic field; and
  the integrated device is enclosed in a housing removably attached to the cover in a slidable connection.

19. A power tool in accordance with claim 18 wherein the housing is coupled to the cover with a dovetail joint and a snap-fit.

20. A power tool in accordance with claim 18 wherein the housing is coupled to the cover with at least one mechanical fastener.

* * * * *